United States Patent
Bell et al.

(10) Patent No.: US 10,480,542 B2
(45) Date of Patent: Nov. 19, 2019

(54) VALVE SYSTEM FOR PNEUMATIC CYLINDERS

(71) Applicant: Aladdin Engineering and Manufacturing, Inc., Waukesha, WI (US)

(72) Inventors: Natalie E. Bell, Richfield, WI (US); Edward R. Horn, Hartland, WI (US); David M. Matz, Hartland, WI (US); Gregory F. Matz, Waukesha, WI (US); Scott R. Jones, Waukesha, WI (US); Edward C. Horn, Hartland, WI (US)

(73) Assignee: Aladdin Engineering and Manufacturing, Inc., Waukesha, WI (US)

(*) Notice: Subject to any disclaimer, the term of this patent is extended or adjusted under 35 U.S.C. 154(b) by 0 days.

(21) Appl. No.: 15/903,532

(22) Filed: Feb. 23, 2018

(65) Prior Publication Data
US 2018/0180189 A1    Jun. 28, 2018

Related U.S. Application Data

(63) Continuation-in-part of application No. 15/189,707, filed on Jun. 22, 2016, now Pat. No. 9,903,487.

(51) Int. Cl.
*F16K 31/12* (2006.01)
*F15B 13/02* (2006.01)
(Continued)

(52) U.S. Cl.
CPC ........ *F15B 13/027* (2013.01); *F15B 11/0413* (2013.01); *F15B 13/0401* (2013.01);
(Continued)

(58) Field of Classification Search
CPC ...... F16K 15/044; F16K 11/025; F16K 11/00; F16K 27/0209; F16K 1/04; F16K 11/205;
(Continued)

(56) References Cited

U.S. PATENT DOCUMENTS

| 2,588,520 A | 3/1952 | Halgren et al. |
| 3,381,587 A | 5/1968 | Parquet |

(Continued)

OTHER PUBLICATIONS

SMC Manufacturing Pneumatics Worldwide, "ASP-X352, Speed Control Valve with Pilot Operated Check Valve," printed from http://www.smcusa.com/top-navigation/cad-models.aspx/44658 on Jun. 22, 2016, 2 pages.

*Primary Examiner* — Minh Q Le
(74) *Attorney, Agent, or Firm* — Michael Best & Friedrich LLP

(57) ABSTRACT

A valve system for use with a cylinder having an extensible rod, includes a first valve assembly including a first inlet/outlet port, a check valve biased toward a closed state, the check valve having a check valve body at least partially receivable within a first port of the cylinder, a flow control valve positioned in series between the first inlet/outlet port and the check valve, and a first pilot port selectively communicable with a pressurized gas for opening the check valve. The valve system further includes a second valve assembly including a second inlet/outlet port, a second pilot port through which the pressurized gas must flow before being introduced to the first pilot port, and a valve body at least partially receivable within a second port of the cylinder, wherein the second inlet/outlet port and the second pilot port are integrally formed as a portion of the valve body.

26 Claims, 28 Drawing Sheets

(51) Int. Cl.
*F16K 15/04* (2006.01)
*F15B 15/14* (2006.01)
*F16K 11/02* (2006.01)
*F15B 15/20* (2006.01)
*F16K 1/04* (2006.01)
*F16K 11/20* (2006.01)
*F16K 15/18* (2006.01)
*F16K 27/02* (2006.01)
*F15B 13/04* (2006.01)
*F15B 13/042* (2006.01)
*F15B 11/04* (2006.01)

(52) U.S. Cl.
CPC ........ *F15B 13/0426* (2013.01); *F15B 15/149* (2013.01); *F15B 15/1428* (2013.01); *F15B 15/1476* (2013.01); *F15B 15/20* (2013.01); *F15B 15/202* (2013.01); *F16K 1/04* (2013.01); *F16K 11/025* (2013.01); *F16K 11/205* (2013.01); *F16K 15/044* (2013.01); *F16K 15/183* (2013.01); *F16K 27/02* (2013.01); *F15B 2211/3051* (2013.01); *F15B 2211/30505* (2013.01); *F15B 2211/40584* (2013.01); *F15B 2211/41527* (2013.01); *F15B 2211/46* (2013.01); *F16K 27/0209* (2013.01)

(58) Field of Classification Search
CPC .... F16K 15/183; F16K 27/02; F15B 15/1428; F15B 15/202; F15B 13/027; F15B 13/0401; F15B 15/1476; F15B 15/149; F15B 15/20; F15B 11/0413; F15B 2211/30505; F15B 2211/3051; F15B 2211/40584; F15B 2211/41527; F15B 2211/46
USPC .............................. 137/596.17, 596; 91/420
See application file for complete search history.

(56) References Cited

U.S. PATENT DOCUMENTS

| | | |
|---|---|---|
| 3,841,668 A | 10/1974 | Williams |
| 3,851,672 A | 12/1974 | De Vincent et al. |
| 3,972,557 A | 8/1976 | Hudston et al. |
| 4,266,466 A | 5/1981 | Ziems |
| 4,287,812 A | 9/1981 | Iizumi |
| 4,458,719 A | 7/1984 | Strybel |
| 4,531,449 A | 7/1985 | Reith |
| 4,633,762 A | 1/1987 | Tardy |
| 4,741,249 A * | 5/1988 | Legris ................ F15B 11/064 91/443 |
| 5,081,904 A | 1/1992 | Horn et al. |
| 5,097,747 A | 3/1992 | Levenez |
| 5,577,433 A | 11/1996 | Henry |
| 5,806,402 A | 9/1998 | Henry |
| 6,131,610 A | 10/2000 | Morisako et al. |
| 6,276,326 B1 | 8/2001 | Martinsson et al. |
| 9,611,871 B2 | 4/2017 | Kot |
| 9,886,679 B2 * | 2/2018 | Bianco ................ G06Q 10/087 |
| 9,903,487 B2 | 2/2018 | Bell et al. |
| 2004/0112208 A1 | 6/2004 | Kot, II |
| 2007/0045585 A1 | 3/2007 | Kress |
| 2007/0234899 A1 | 10/2007 | Bayreuther et al. |

* cited by examiner

FIG. 5

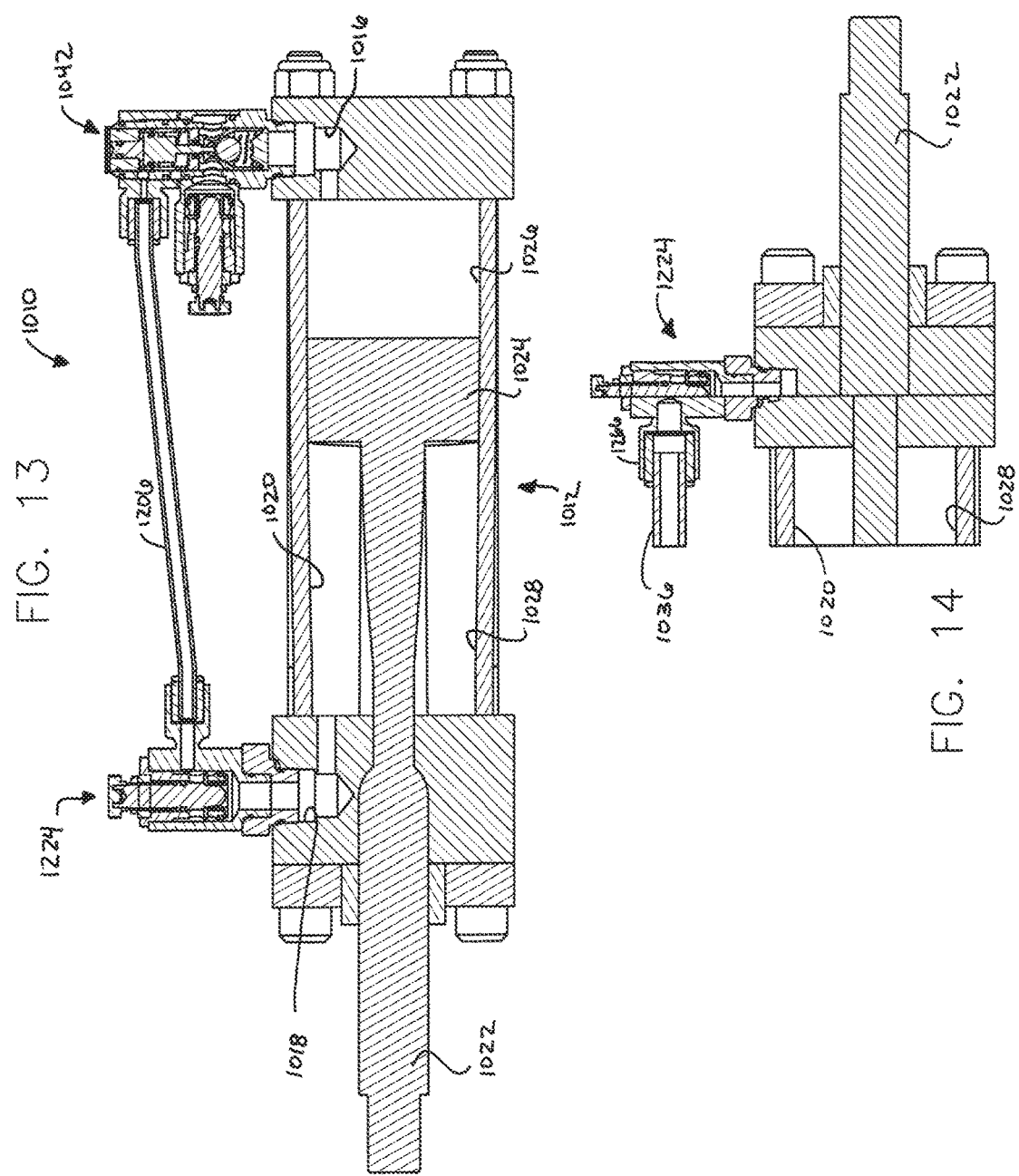

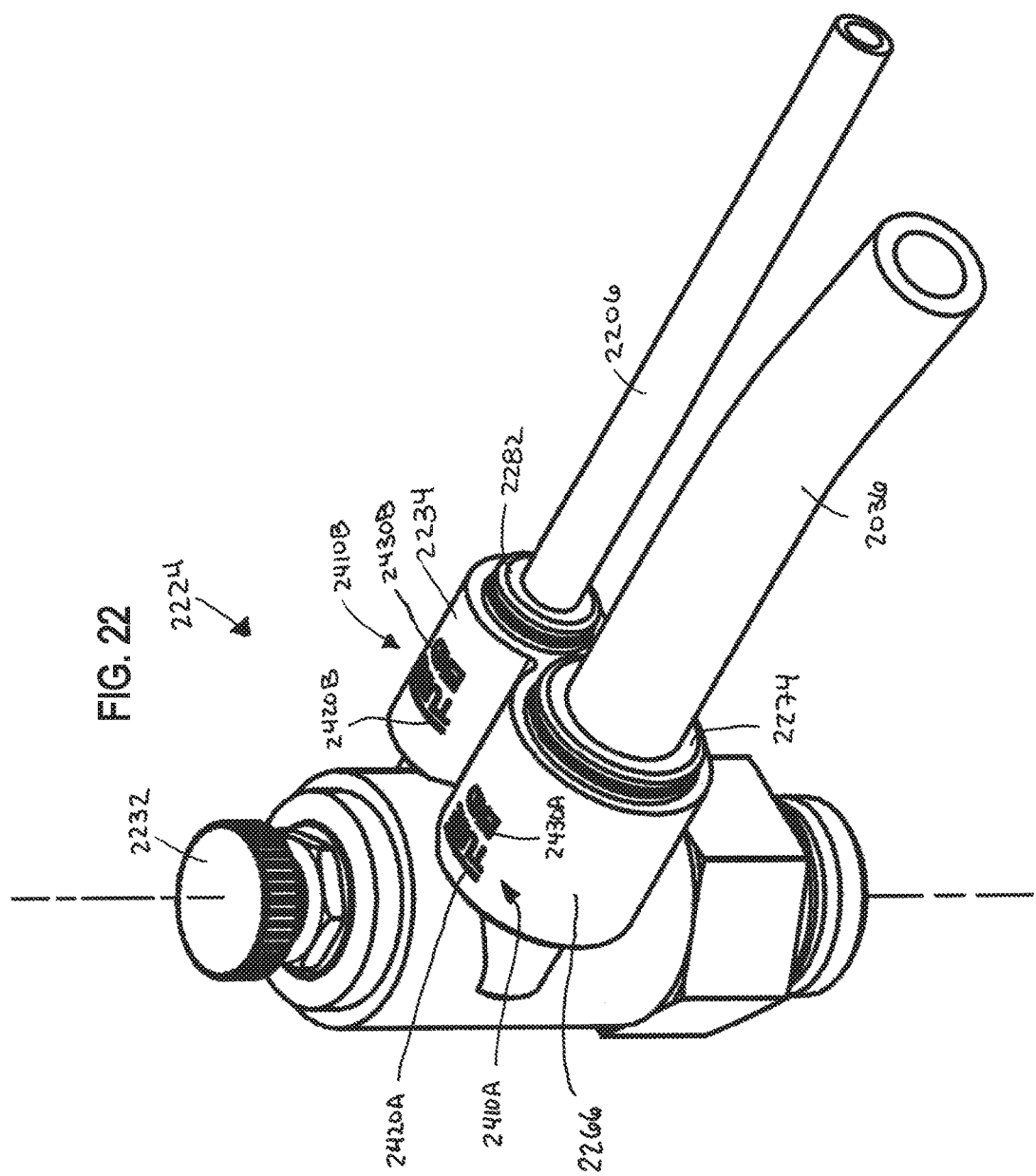

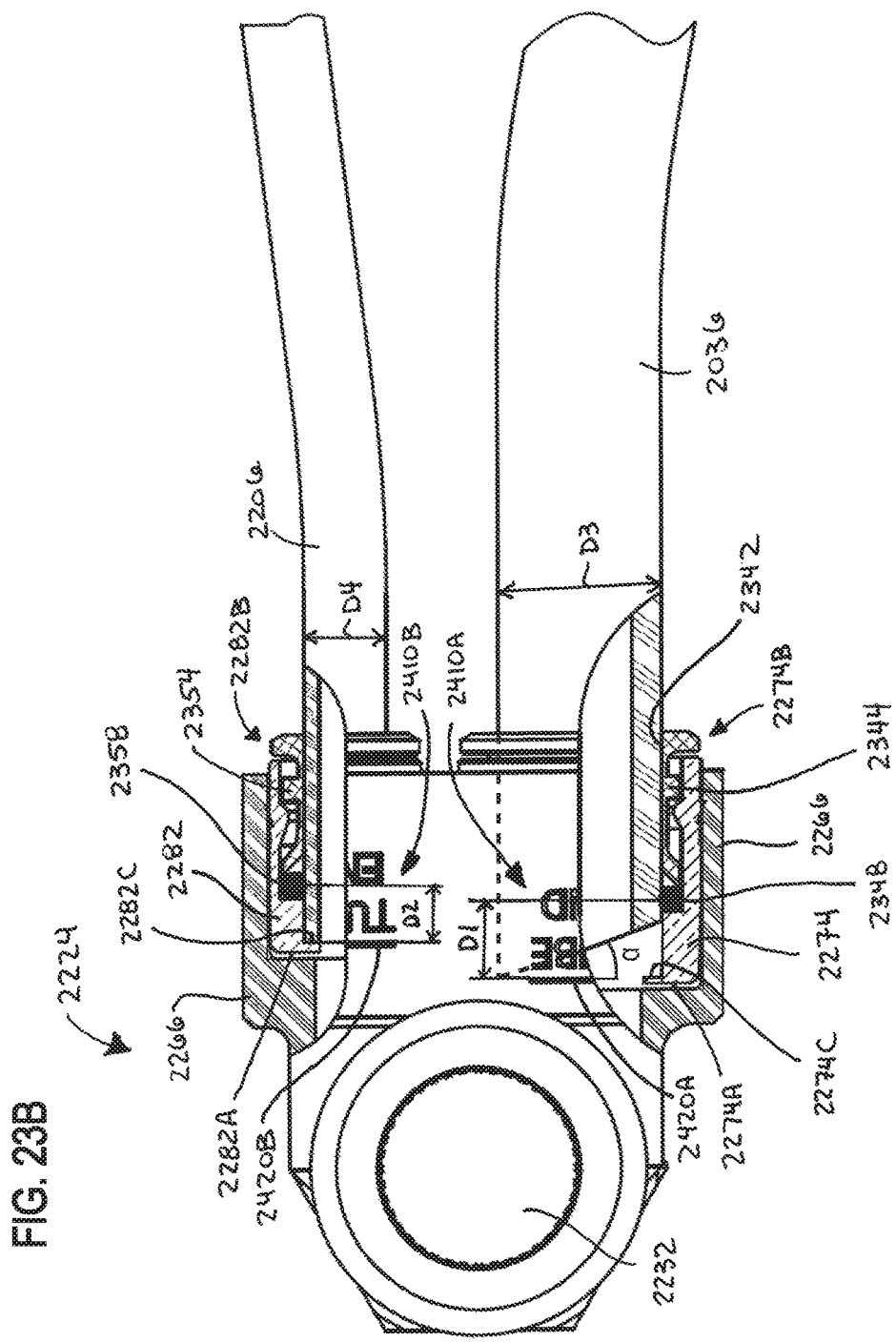

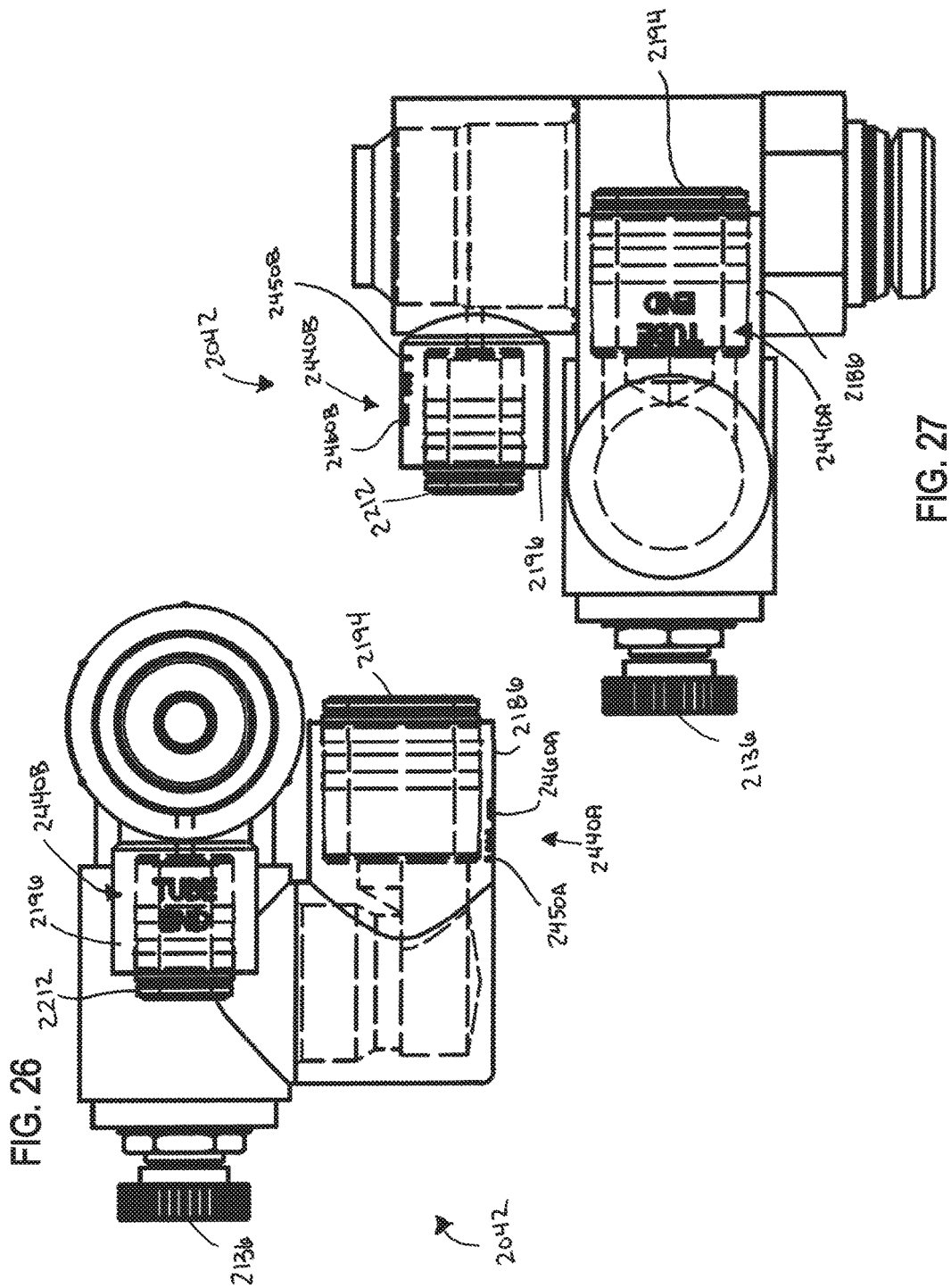

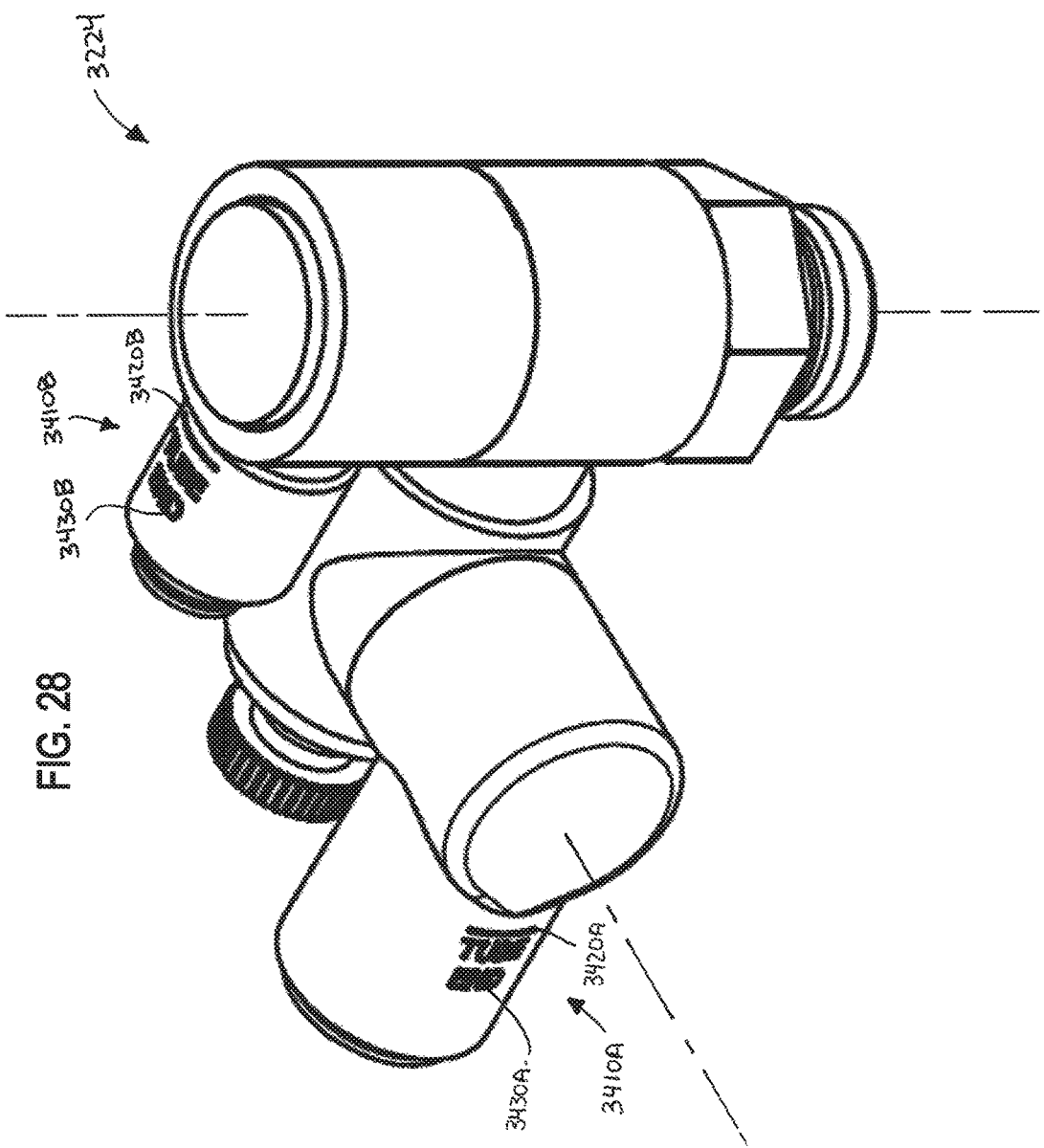

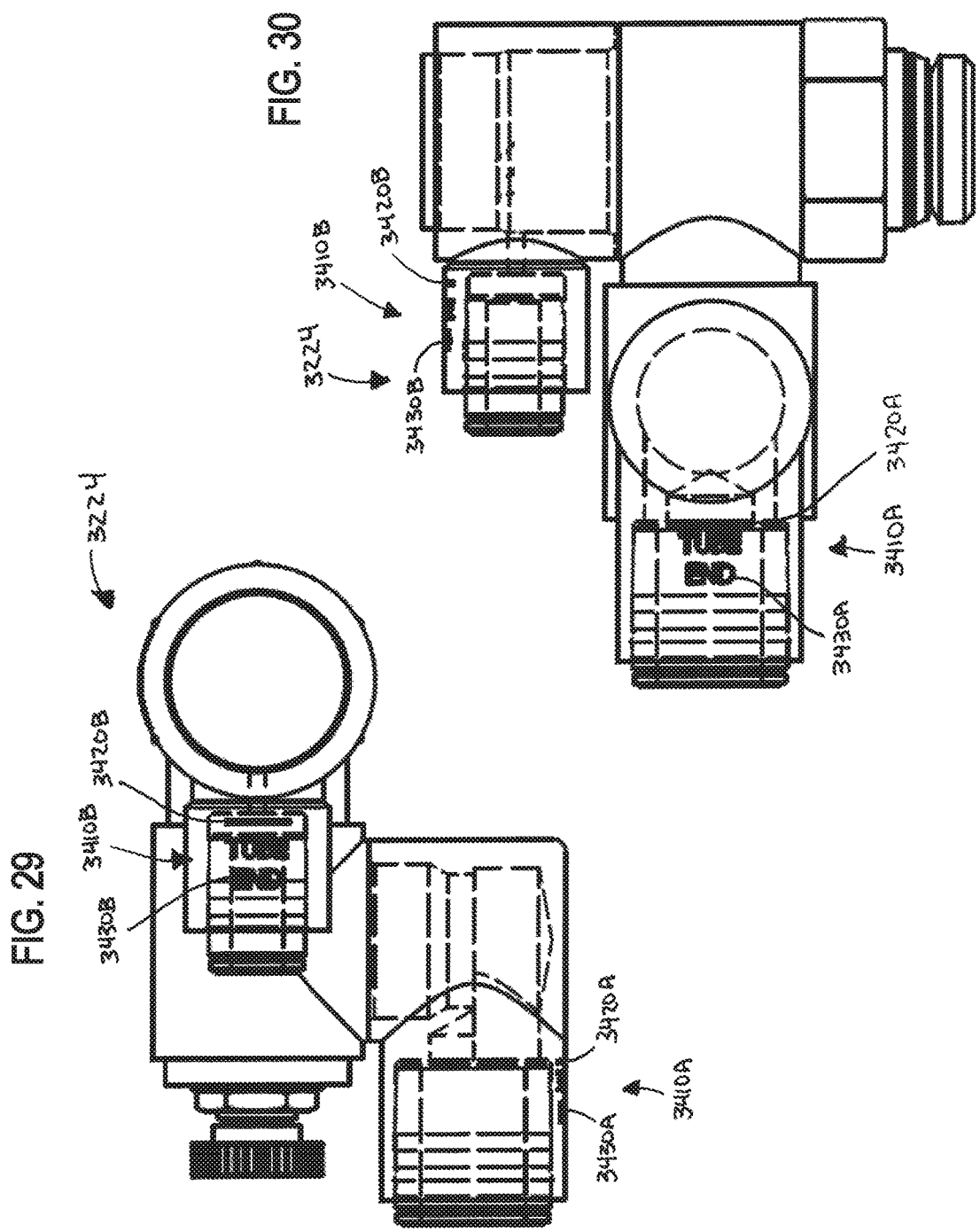

VALVE SYSTEM FOR PNEUMATIC CYLINDERS

CROSS-REFERENCE TO RELATED APPLICATIONS

This application is a continuation-in-part of co-pending U.S. patent application Ser. No. 15/189,707 filed on Jun. 22, 2016, the entire content of which is incorporated herein by reference.

FIELD OF THE INVENTION

The present invention relates to a valve system, and more particularly to a valve system for use with a pneumatic cylinder.

BACKGROUND OF THE INVENTION

Pneumatic cylinders utilize a compressed gas to produce a force and axially translate an extensible rod and piston. A single acting cylinder includes a piston which is biased in a single direction by a spring or alternative biasing member. When the pressurized gas exerts a force against the biasing member great enough to overcome a spring force, the biasing member compresses, thereby allowing the piston and extensible rod to translate. When the gas pressure decreases, the piston and extensible rod translate in the opposing direction. A double acting cylinder does not include a spring or biasing member, but instead relies upon gas pressure to move the piston and extensible rod in opposing directions, thereby requiring an influx of gas into the pneumatic cylinder to both extend and retract the piston and extensible rod.

SUMMARY OF THE INVENTION

The invention provides, in one aspect, a valve system for use with a cylinder having an extensible rod. The valve system includes a first valve assembly including a first inlet/outlet port, a check valve biased toward a closed state, the check valve having a check valve body at least partially receivable within a first port of the cylinder, a flow control valve positioned in series between the first inlet/outlet port and the check valve, and a first pilot port selectively communicable with a source of pressurized gas for opening the check valve. The valve system further includes a second valve assembly including a second inlet/outlet port, a second pilot port through which the pressurized gas must flow before being introduced to the first pilot port, and a valve body at least partially receivable within a second port of the cylinder, wherein the second inlet/outlet port and the second pilot port are integrally formed as a portion of the valve body.

The invention provides, in another aspect, a valve system for use with a cylinder having an extensible rod. The valve system includes a valve body at least partially receivable within an inlet/outlet port of the cylinder, an inlet/outlet port extending from the valve body and in fluid communication with an interior chamber of the valve body, and a reference indicium located on an exterior surface of the inlet/outlet port for indicating a cut length for a hose attached to the inlet/outlet port.

Other features and aspects of the invention will become apparent by consideration of the following detailed description and accompanying drawings.

BRIEF DESCRIPTION OF THE DRAWINGS

FIG. 5 is a cross-sectional view of the first valve assembly of FIG. 1 along section 5-5 in FIG. 2.

FIG. 8A is an enlarged view of the first valve assembly of the valve system and cylinder of FIG. 8.

FIG. 8B is an enlarged view of the second valve assembly of the valve system and cylinder of FIG. 8.

FIG. 9A is an enlarged view of the first valve assembly of the valve system and cylinder of FIG. 9.

FIG. 9B is an enlarged view of the second valve assembly of the valve system and cylinder of FIG. 9.

FIG. 10A is an enlarged view of the first valve assembly of the valve system and cylinder of FIG. 10.

FIG. 10B is an enlarged view of the second valve assembly of the valve system and cylinder of FIG. 10.

FIG. 13 is a cross-sectional view of the valve system and cylinder of FIG. 11, along section 13-13 in FIG. 12, illustrating an extensible rod of the cylinder in a central position.

FIG. 14 is a cross-sectional view of the valve system and cylinder of FIG. 11, along section 14-14 in FIG. 12.

FIG. 18A is an enlarged view of the first valve assembly of the valve system and cylinder of FIG. 18.

FIG. 18B is an enlarged view of the second valve assembly of the valve system and cylinder of FIG. 18.

FIG. 19A is an enlarged view of the first valve assembly of the valve system and cylinder of FIG. 19.

FIG. 19B is an enlarged view of the second valve assembly of the valve system and cylinder of FIG. 19.

FIG. 20A is an enlarged view of the first valve assembly of the valve system and cylinder of FIG. 20.

FIG. 20B is an enlarged view of the second valve assembly of the valve system and cylinder of FIG. 20.

FIG. 22 is a perspective view of a second valve assembly.

FIG. 23B is a top view of the second valve assembly of FIG. 22, with a tube cut at an angle.

FIG. 26 is a top view of the first valve assembly of FIG. 25.

FIG. 27 is a side view of the first valve assembly of FIG. 25.

FIG. 28 is a perspective view of another second valve assembly.

FIG. 29 is a top view of the second valve assembly of FIG. 28.

FIG. 30 is a side view of the second valve assembly of FIG. 28.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
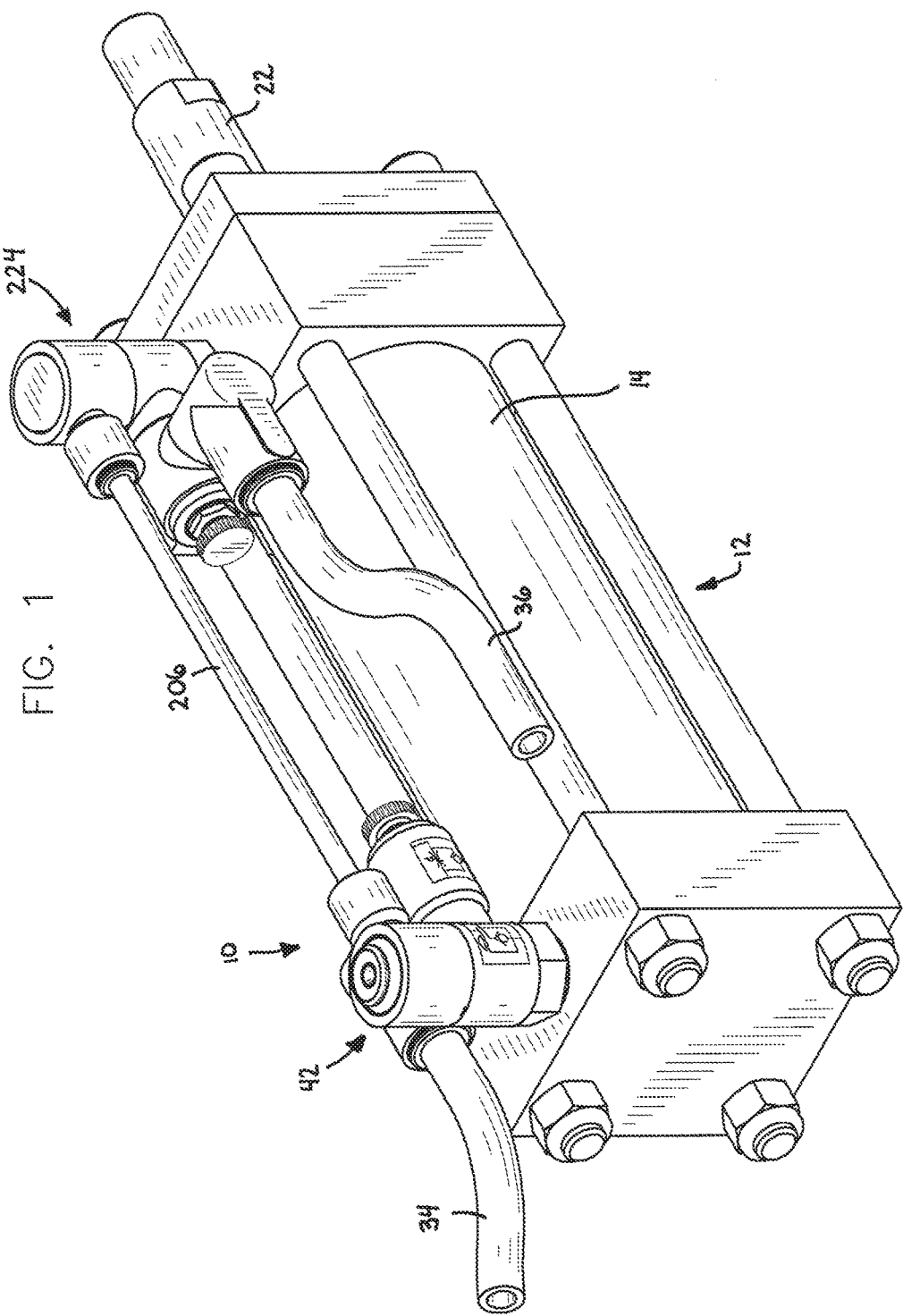
FIG. 1 is a perspective view of a valve system in accordance with an embodiment of the invention for use with a cylinder.
Figure 2:
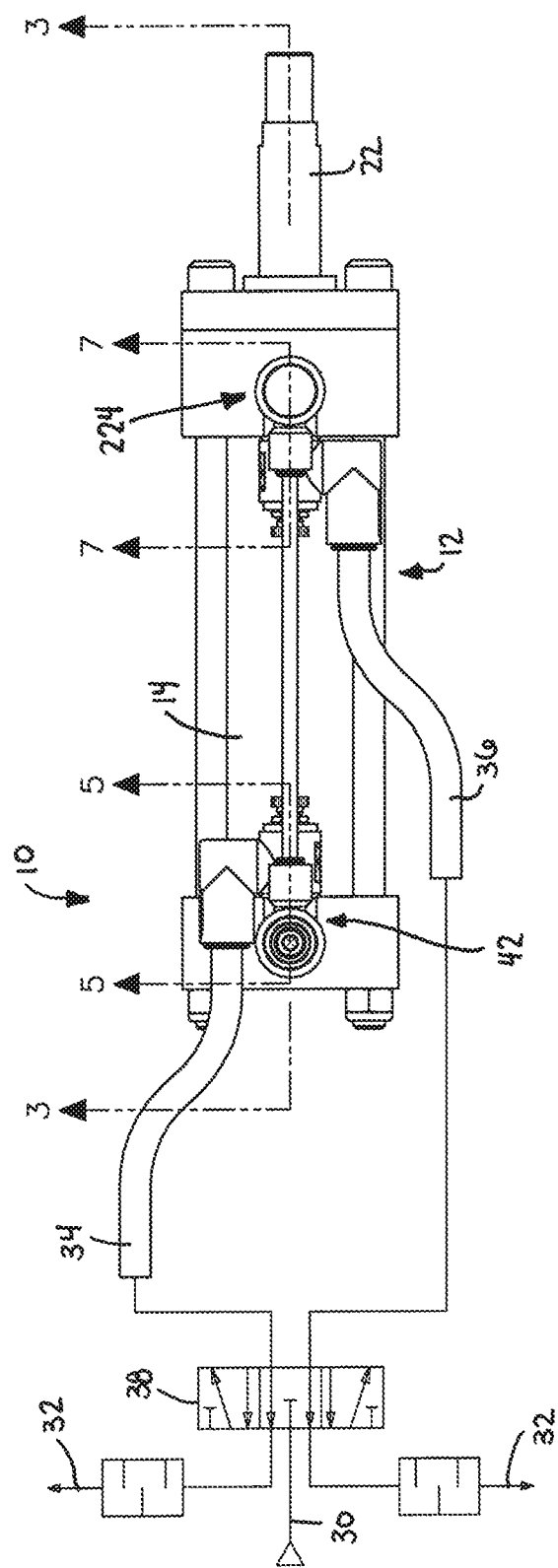
FIG. 2 is a top view of the valve system and cylinder of FIG. 1 with a schematic representation of adjoining valve structure.
Figure 3:
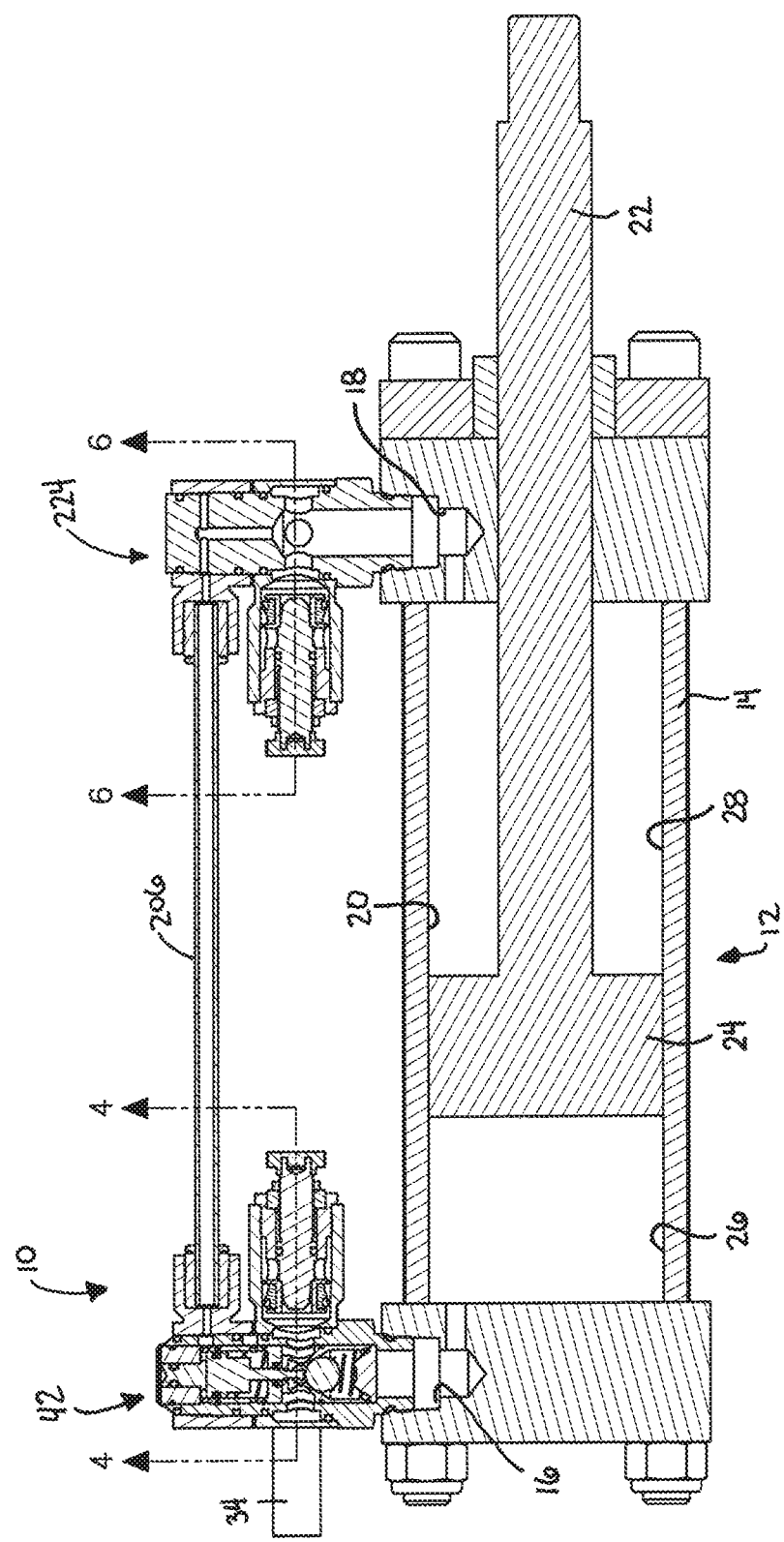
FIG. 3 is a cross-sectional view of the valve system and cylinder of FIG. 1, along section 3-3 in FIG. 2, illustrating an extensible rod of the cylinder in a central position.

With reference to FIGS. 1-3, a valve system 10 for use with a pneumatic cylinder 12 is shown. The cylinder 12 includes a housing 14, dual inlet/outlet ports 16, 18 in fluid communication with a chamber 20 defined within the housing 14, and an extensible rod 22 (FIG. 3). The extensible rod 22 includes a piston 24 that separates the chamber 20 into a first chamber portion 26 and a second chamber portion 28, the volume of each of which is variable and dependent upon the position of the piston 24 within the chamber 20. As described in further detail below, the valve system 10 is operable to direct pressurized gas (e.g., air) into the first chamber portion 26 or the second chamber portion 28, respectively, to cause the rod 22 to extend or retract.

With reference to FIG. 2, the valve system 10 is in fluid communication with a supply 30 or source of pressurized gas and an exhaust 32 (e.g., a vent to atmosphere or a gas recycling system) via pneumatic lines 34, 36 and a three-position valve 38. As described in further detail below, in a first position of the three-position valve 38 (shown in FIG. 2), both of the first and second chamber portions 26, 28 of the cylinder 12 are vented, through the valve system 10, to the exhaust 32. In a second position (FIG. 8), the three-position valve 38 and the valve system 10 direct pressurized gas from the pressurized gas source 30 to the first chamber portion 26, while the second chamber portion 28 is vented to the exhaust 32, causing the rod 22 to extend. In a third position (FIG. 9), the three-position valve 38 and the valve system 10 direct pressurized gas from the pressurized gas source 30 to the second chamber portion 28, while the first chamber portion 26 is vented to the exhaust 32, causing the rod 22 to retract.

With reference to FIGS. 1 and 3, the valve system 10 includes a first valve assembly 42 fluidly connected with the rear inlet/outlet port 16 of the cylinder 12 or first cylinder port 16, which is in fluid communication with the first chamber portion 26. The first valve assembly 42 includes a check valve 44 (FIG. 5) having a check valve body 46 directly attached and at least partially receivable within the rear inlet/outlet port 16 of the cylinder 12 (FIG. 3). Specifically, the check valve body 46 includes a threaded end 48 (FIG. 5) having a universal thread form compatible with multiple different thread configurations (e.g., unified, metric, square, etc.). In this manner, the first valve assembly 42 is compatible with pneumatic cylinders 12 having inlet/outlet ports with NPT, NPTF, BSPP, BSPT, JIS (PF) and JIS (PT) thread forms. The check valve body 46 also includes a seal 50 positioned adjacent the threaded end 48 that is engageable with the opening of the inlet/outlet port 16 to prevent leakage from the inlet/outlet port 16. The seal 50 may be made from a polymer or another material.

Figure 5:
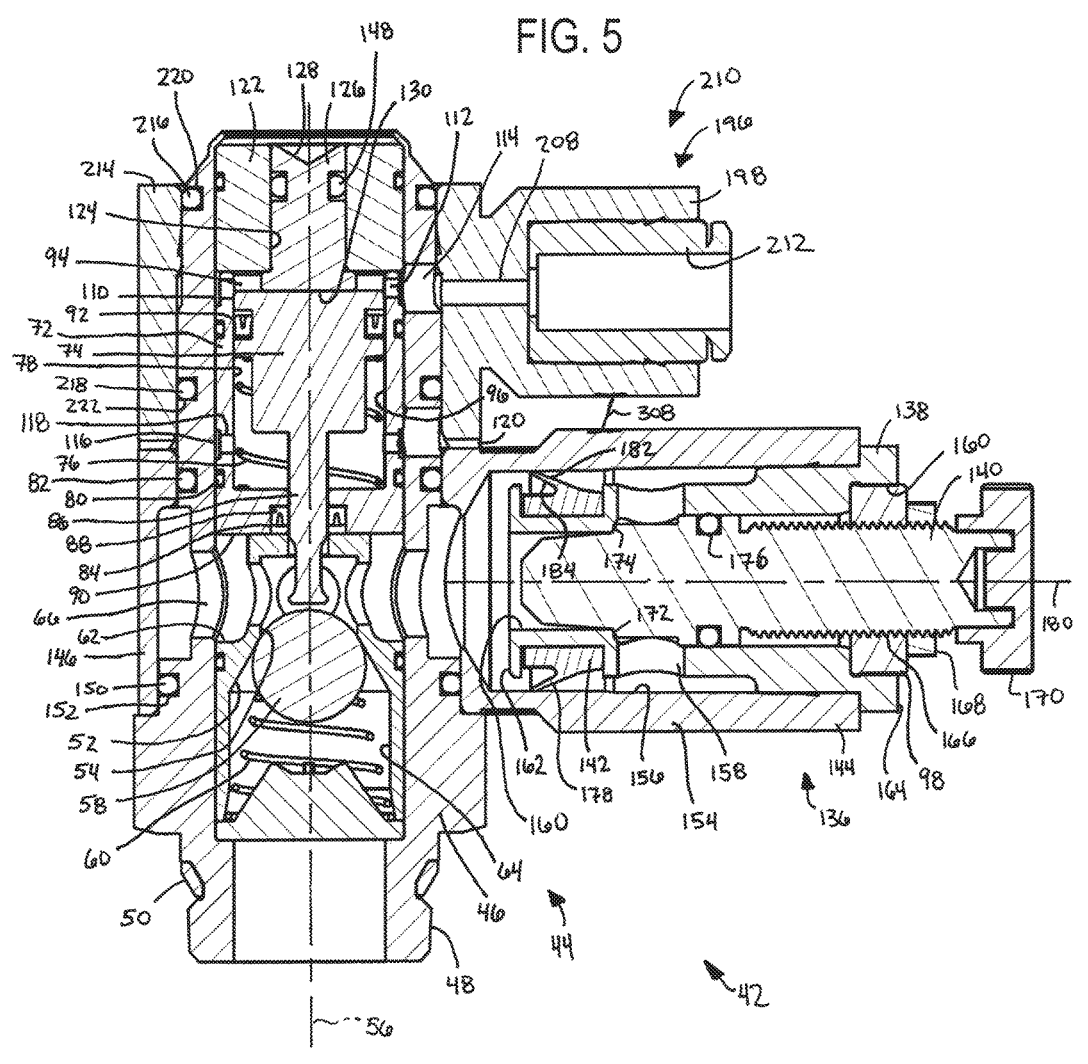

With continued reference to FIG. 5, the check valve 44 also includes an internal seat 52 defining a circular orifice 54 coaxial with a longitudinal axis 56 of the check valve body 46, a seal member 58 (e.g., a check ball), and a biasing member 60 (e.g., a compression spring) for biasing the ball 58 against the seat 52 to thereby close the orifice 54. Accordingly, when the check ball 58 is in a closed position, the orifice 54 is closed and the interior of the check valve body 46 is separated into an upper cavity 62 above the valve seat 52 (from the frame of reference of FIG. 5) and a lower cavity 64 beneath the valve seat 52. The check valve body 46 includes multiple apertures 66, each of which is oriented transverse to the longitudinal axis 56, exposed to the upper cavity 62, while the lower cavity 64 is directly exposed to and in fluid communication with the first chamber portion 26 of the cylinder 12 when the first valve assembly 42 is attached to the rear inlet/outlet port 16 of the cylinder 12.

With continued reference to FIG. 5, the check valve 44 further includes a sleeve 72 positioned within the check valve body 46, a plunger 74 that is slidable within the sleeve 72 along the longitudinal axis 56, and a biasing member 76 (e.g., a compression spring) for biasing the plunger 74 upwards (from the frame of reference of FIG. 5) and away from the check ball 58. The sleeve 72 defines an internal chamber 78 that is sealed from the upper cavity 62 by an O-ring 80 on an exterior of the sleeve and a lip seal 84, through which a tip 86 of the plunger 74 extends, within a stepped aperture 88 in a bottom end 90 of the sleeve 72. The plunger 74 also includes a circular lip seal 92 on its exterior that is in sliding contact with an interior wall of the sleeve 72, thereby separating the sleeve chamber 78 into an upper sleeve chamber 94 (from the frame of reference of FIG. 5) and a lower sleeve chamber 96 in which the spring 76 is located. The volume of each of the upper and lower sleeve chambers 94, 96 is variable depending upon the position of the plunger 74 relative to the sleeve 72.

The sleeve 72 includes an upper circumferential recess 110 on its exterior and multiple apertures 112, each of which is oriented transverse to the longitudinal axis 56, fluidly interconnecting the upper sleeve chamber 94 and the upper circumferential recess 110. The check valve body 46 includes a single aperture 114, which is also oriented transverse to the longitudinal axis 56, having a radially inner end directly exposed to and in fluid communication with the upper circumferential recess 110 in the sleeve 72 and a radially outer end exposed to an exterior surface of the check valve body 46. The sleeve 72 also includes a lower circumferential recess 116 on its exterior and multiple apertures 118, each of which is oriented transverse to the longitudinal axis 56, fluidly interconnecting the lower sleeve chamber 96 and the lower circumferential recess 116. The check valve body 46 includes a single aperture 120, which is also oriented transverse to the longitudinal axis 56, having a radially inner end directly exposed to and in fluid communication with the lower circumferential recess 116 in the sleeve 72 and a radially outer end exposed to the exterior surface of the check valve body 46.

With continued reference to FIG. 5, the check valve 44 also includes an end cap 122, positioned above the sleeve 72, having a cylindrical bore 124 coaxial with the longitudinal axis 56 and a manual release button 126 slidably positioned within the cylindrical bore 124. A top end 128 of the button 126 is exposed and accessible by an operator outside the check valve body 46, while a bottom end 130 of the button 126 is abutted with the plunger 74. The button 126 includes an O-ring 148 on its exterior to prevent any pressurized gas within the upper sleeve chamber 94 from escaping through the cylindrical bore 124 in the end cap 122.

Figure 4:
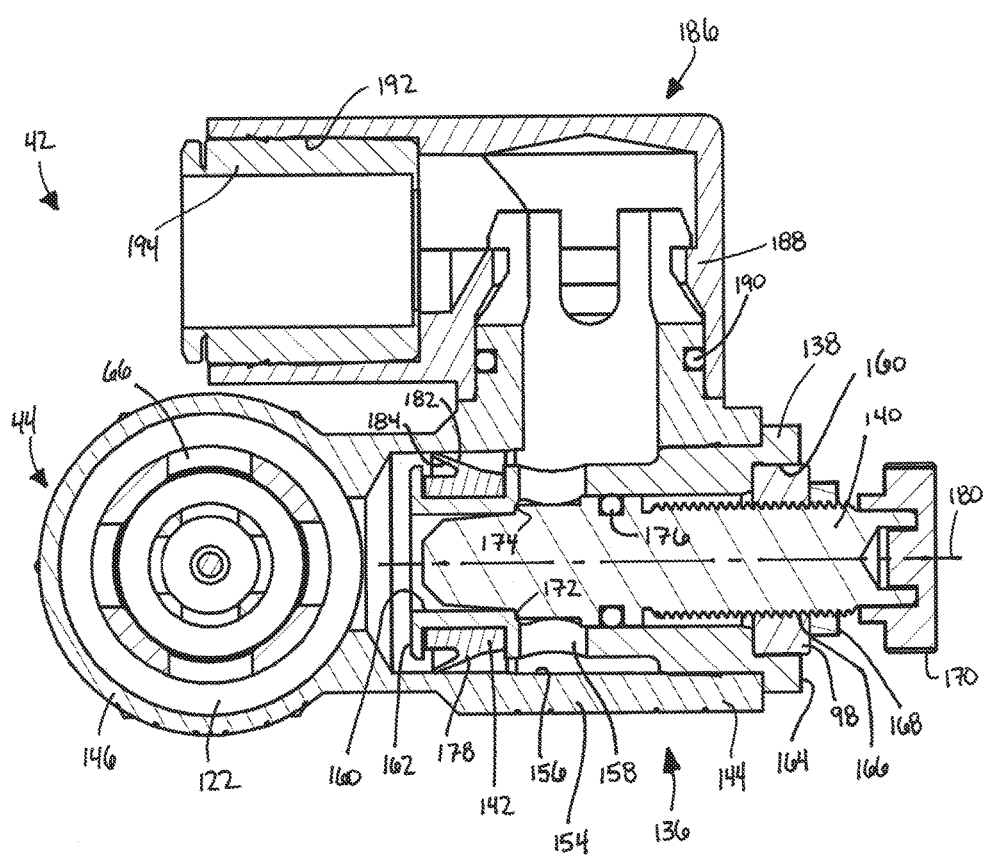
FIG. 4 is a cross-sectional view of a first valve assembly of the valve system of FIG. 1 along section 4-4 in FIG. 3.

With reference to FIGS. 4 and 5, the first valve assembly 42 also includes a first flow control valve 136 coupled to the check valve body 46. The first flow control valve 136 includes an insert 138, a valve member or needle 140, and a one-way seal 142. The first flow control valve 136 is received within a banjo fitting 144, a hoop portion 146 of which is slip-fit over the check valve body 46 and overlapping the apertures 66 in the check valve body 46 exposed to the upper cavity 62. The hoop portion 146 is stepped to seal against an O-ring 82 located above the apertures 66, and another O-ring 150 located within a recess 152 in the check valve body 46 below the apertures 66 (from the frame of reference of FIG. 5). The O-rings 82, 150 provide a seal between the banjo fitting 144 and the check valve body 46 to prevent unwanted leakage of the pressurized gas. The banjo fitting 144 further includes a cylindrical portion 154 that extends transverse to the longitudinal axis 56 and is hollow, defining a fitting chamber 156, to support the insert 138, needle 140, and one-way seal 142.

The insert 138 is tubular, including a stepped inside diameter, and is axially aligned with the cylindrical portion 154 of the banjo fitting 144. The insert 138 includes radially extending apertures 158 that provide a fluid flow path between the fitting chamber 156 and the interior of the insert 138. The insert 138 further includes respective openings 160 at opposite ends 162, 164, with a first end 162 of the insert 138 being exposed to the upper cavity 62 of the check valve body 46, and a second end 164 to which an end cap 98 is affixed through which the needle 140 extends. The needle 140 includes a threaded portion 166 engaged with corresponding threads on the end cap 98, and a lock nut 168 is threaded onto the threaded portion 166 of the needle 140 for abutting the end cap 98 and rotationally constraining the needle 140 relative to the end cap 98 once the position of the needle 140 within the insert 138 is set. The needle 140 also includes a knob 170 at the distal end thereof that is graspable by an operator for setting the position of the needle 140 within the insert 138.

With continued reference to FIGS. 4 and 5, the needle 140 includes a step 172 that rests against a seat 174 of the insert 138 when the needle 140 is in a fully closed position. Fluid flow between the needle 140 and insert 138 is prohibited when the needle 140 is in the fully closed position. The needle 140 is unseated from the seat 174 into an open position (i.e., any position except the fully closed position) by rotating the knob 170 in an opening direction, which rotates the threaded portion 166 of the needle 140 relative to the end cap 98 to translate the needle 140. Fluid flow between the needle 140 and insert 138 is allowed when the needle 140 is in the open position and is variable based on the displacement of the step 172 relative to the seat 174. As the distance between the step 172 and the seat 174 increases, the rate at which gas can flow between the needle 140 and the insert 138 also increases. The needle 140 also includes an O-ring 176 located between the step 172 and the threaded portion 166 that prohibits gas within the insert 138 from leaking past the end cap 98.

The one-way seal 142 surrounds the insert 138 and abuts both the insert 138 and the cylindrical portion 154 of the banjo fitting 144. The one-way seal 142 is made of a resilient material, permitting the seal to selectively deflect or deform in response to the application of a gas pressure on one side of the seal 142 to provide a flow path from the fitting chamber 156 to the check valve 44, thereby bypassing the needle 140. Specifically, the one-way seal 142 includes an annular rim 178 that is obliquely oriented relative to a longitudinal axis 180 of the needle 140, such that pressurized gas acting on a first side 182 of the seal 142 is capable of deflecting the rim 178 to provide a flow path between the seal 142 and the cylindrical portion 154 of the banjo fitting 144, and preventing such a path in the opposing direction. In the opposing direction, pressurized gas presses a second side 184 of the seal 142 (i.e., opposite the first side 182 of the seal 142) into contact with the cylindrical portion 154, preventing the flow of pressurized gas therebetween. In this manner, the flow control valve 136 selectively provides a flow path between the check valve 44 and a first inlet/outlet port 186.

As shown in FIG. 4, first valve assembly 42 further includes a first inlet/outlet port 186 coupled to the banjo fitting 144 and in communication with the fitting chamber 156. In the illustrated embodiment, the first inlet/outlet port 186 and the banjo fitting 144 are connected by a swivel joint 188, which permits the first inlet/outlet port 186 to be reoriented relative to the banjo fitting 144. An O-ring 190 is located adjacent the swivel joint 188 to seal the banjo fitting 144 to the first inlet/outlet port 186.

The first inlet/outlet port 186 communicates with the three position valve 38 via the hose 34 (see FIGS. 1 and 2). When connected to the exhaust 32, the first inlet/outlet port 186 functions as an outlet to allow pressurized gas to exhaust from the first chamber portion 26 of the cylinder 12, through the check valve 44, through the first flow control valve 136, and through the first inlet/outlet port 186 before being discharged to the exhaust 32. When connected to the air supply 30, the first inlet/outlet port 186 functions as an inlet to allow pressurized gas to flow into the first inlet/outlet port 186, through the first flow control valve 136, and through the check valve 44 before entering the first chamber portion 26 of the cylinder 12. With reference to FIG. 4, the inlet/outlet port 186 includes a stepped region 192 sized to receive a quick-lock fitting 194 (e.g., as illustrated, the outer shell of a push-lock fitting) for connecting the hose 34 (i.e., from the three position valve 38) to the inlet/outlet port 186. Such a push-lock fitting 194 is commercially available from Camozzi Pneumatics, Inc. of McKinney, Tex., United States of America.

With reference to FIG. 5, the first valve assembly 42 also includes a first pilot port 196 in communication with the check valve 44. In the illustrated embodiment, the first pilot port 196 is defined by a cylindrical portion 198 of a banjo fitting 210 in which a fitting 212 (e.g., a push-lock fitting) is received. The hoop portion 214 of the banjo fitting 210 is slip-fit over the check valve body 46 and overlaps the single aperture 114 in the check valve body 46 exposed to the upper sleeve chamber 94. As shown, the banjo fitting 210 defining the first pilot port 196 is stackable upon the banjo fitting 144 in which the first flow control valve 136 is received. The hoop portion 214 seals against the check valve body 46 via two O-rings 216, 218, one located above the single aperture 114, the other located below the single aperture 114 (from the frame of reference of FIG. 5) and located within respective recesses 220, 222 in the check valve body 46. The O-rings 216, 218 provide a seal between the banjo fitting 210 and the check valve body 46 to prevent unwanted leakage of the pressurized gas. The cylindrical portion 198 of the banjo fitting 210 extends transverse to the longitudinal axis 56 and is hollow, defining the first pilot port 196, to support the fitting 212. The first pilot port 196 is in communication with the single aperture 114, and therefore the upper sleeve chamber 94, via a cavity 208 that interconnects the hoop and cylindrical portions 214, 198 of the banjo fitting 210. The fitting is sized to accept a hose or pneumatic line 206 (FIGS. 1-3), the purpose of which is described in further detail below.

With reference to FIGS. 1-3 and 6-7, the valve system 10 includes a second valve assembly 224 fluidly connected with the front inlet/outlet port 18 of the cylinder 12 or second cylinder port 18, which is in fluid communication with the second chamber portion 28. Alternatively, the second valve assembly 224 may be fluidly connected to the rear inlet/outlet port 16, with the first valve assembly 42 fluidly connected to the front inlet/outlet port 18. The second valve assembly 224 includes a valve body 226 (FIG. 7) directly attached and at least partially receivable within the front inlet/outlet port 18 of the cylinder 12 (FIG. 3). Specifically, the valve body 226 includes a threaded end 228 (FIG. 7) having a thread form compatible with multiple different thread configurations, identical to the threaded end 48 of the check valve body 46. The valve body 226 also includes a seal 200 positioned adjacent the threaded end 228 that is engageable with the opening of the inlet/outlet port 18 to prevent leakage from the inlet/outlet port 18. Similar to the seal 50, the seal 200 may be made from a polymer or another material.

Figure 7:
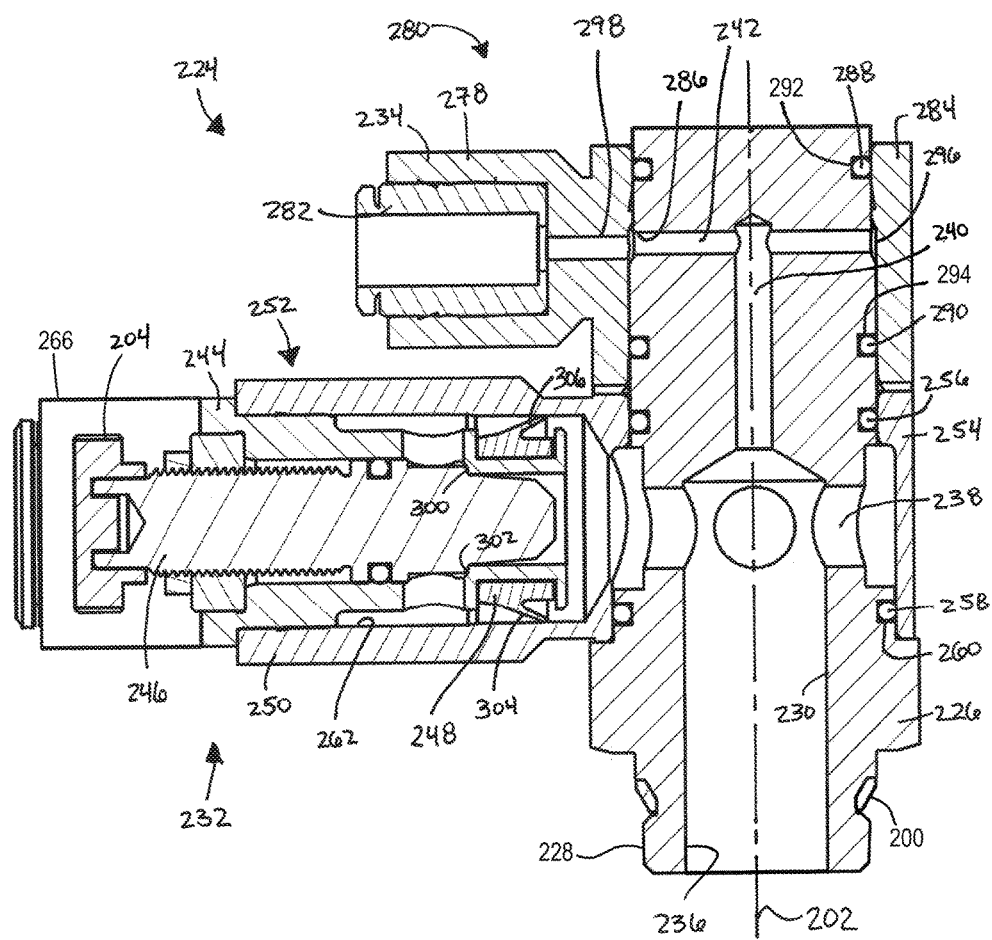
FIG. 7 is a cross-sectional view of the second valve assembly of FIG. 1 along section 7-7 in FIG. 2.

With continued reference to FIG. 7, the interior of the valve body 226 includes a single chamber 230 in continuous fluid communication with the second chamber portion 28 of the cylinder 12, a second flow control valve 232, and a second pilot port 234. Unlike the first valve assembly 42, the valve body 226 does not include a check valve, and therefore permits free flow of pressurized gas at all times throughout the single chamber 230 of the valve body 226. The single chamber 230 includes a first cavity 236 having a lower end in fluid communication with the front inlet/outlet port 18 and an upper end in fluid communication with radially extending apertures 238 exposed to the outer periphery of the valve body 226. The single chamber 230 also includes a coaxial second cavity 240 having a smaller diameter than the first cavity 236, and a third cavity 242 that extends transverse to a longitudinal axis 202 of the valve body 226 and that is exposed to an outer periphery of the valve body 226.

Figure 6:
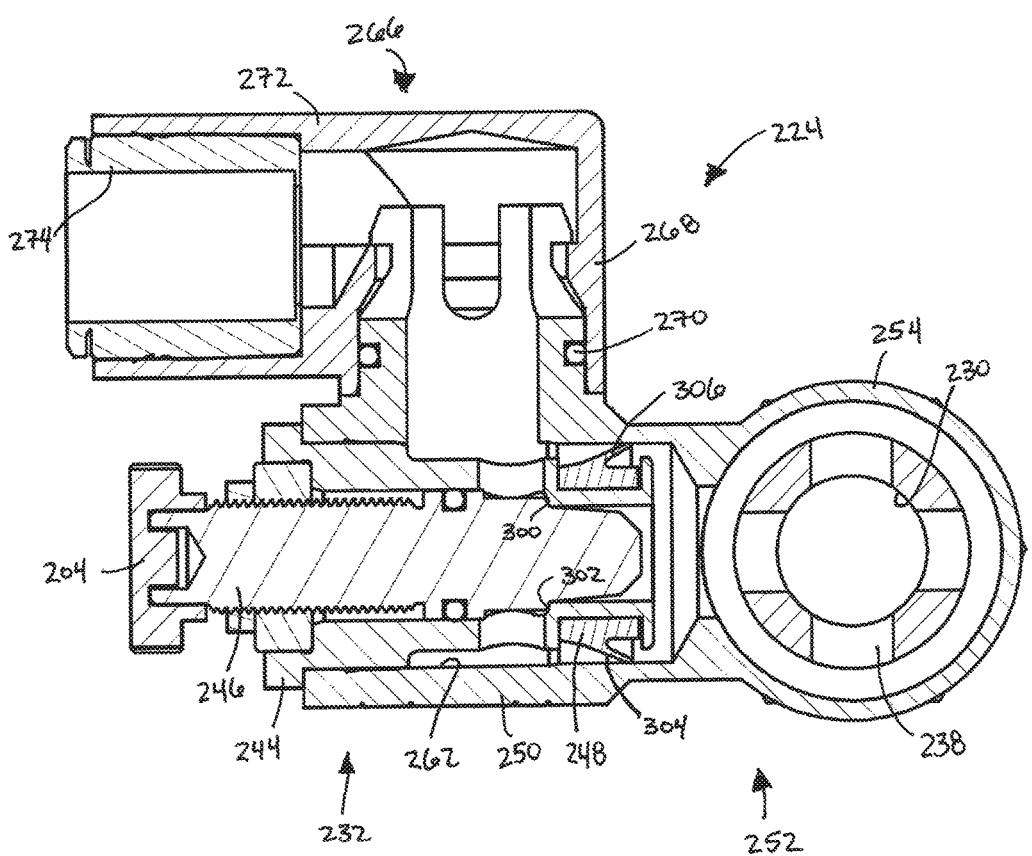
FIG. 6 is a cross-sectional view of a second valve assembly of the valve system of FIG. 1 along section 6-6 in FIG. 3.

With reference to FIGS. 6 and 7, the second valve assembly 224 also includes a second flow control valve 232 coupled to the valve body 226. Though annotated with new reference numerals, except as otherwise described, the second flow control valve 232 is identical to the first flow control valve 136. The second flow control valve 232 includes an insert 244, a valve member or needle 246, and a one-way seal 248. The second flow control valve 232 is received within a cylindrical portion 250 of a banjo fitting 252, a hoop portion 254 of which is slip-fit over the valve body 226 and overlapping the apertures 238 in the valve body 226 exposed to the first cavity 236. The hoop portion 254 is stepped to seal against an O-ring 256 located above the apertures 238, and another O-ring 258 located within a recess 260 in the valve body 226 below the apertures 238 (from the frame of reference of FIG. 7). The O-rings 256, 258 provide a seal between the banjo fitting 252 and the valve body 226 to prevent unwanted leakage of the pressurized gas. The banjo fitting 252 further includes a cylindrical portion 250 that extends transverse to the longitudinal axis 202 and is hollow, defining a fitting chamber 262, to support the insert 244, needle 246, and one-way seal 248.

As shown in FIG. 6, the second valve assembly 224 further includes a second inlet/outlet port 266 coupled to the banjo fitting 252 and in communication with the fitting chamber 262. In the illustrated embodiment, the second inlet/outlet port 266 and the banjo fitting 252 are connected by a swivel joint 268, which permits the second inlet/outlet port 266 to be reoriented relative to the banjo fitting 252. An O-ring 270 is located adjacent the swivel joint 268 to seal the banjo fitting 252 to the second inlet/outlet port 266.

The second inlet/outlet port 266 communicates with the three position valve 38 via the hose 36 (FIGS. 1 and 2). When connected to the exhaust 32, the second inlet/outlet port 266 functions as an outlet to allow pressurized gas to exhaust from the second chamber portion 28 of the cylinder 12, through the single chamber 230 of the valve body 226, through the second flow control valve 232, and through the second inlet/outlet port 266 before being discharged to the exhaust 32. When connected to the air supply 30, the second inlet/outlet port 266 functions as an inlet to allow pressurized gas to flow through the second inlet/outlet port 266, through the second flow control valve 232, and through the single chamber 230 of the valve body 226 before reaching the second chamber portion 28 of the cylinder 12. With reference to FIG. 6, the inlet/outlet port 266 includes a stepped region 272 sized to receive a quick-lock fitting 274 (e.g., a push-lock fitting) for connecting the hose 36 (i.e., from the three position valve 38) to the inlet/outlet port 266. Such a push-lock fitting 274 is commercially available from Camozzi Pneumatics, Inc. of McKinney, Tex., United States of America.

With reference to FIG. 7, the second valve assembly 224 also includes a second pilot port 234 in communication with the single chamber 230. In the illustrated embodiment, the second pilot port 234 is defined by a cylindrical portion 278 of a banjo fitting 280 in which a fitting 282 (e.g., a push-lock fitting) is received. The hoop portion 284 of the banjo fitting 280 is slip-fit over the valve body 226 and overlaps the outlets 286 of the third cavity 242. As shown, the banjo fitting 280 defining the second pilot port 234 is stackable upon the banjo fitting 252 in which the second flow control valve 232 is received. The hoop portion 284 seals against the valve body 226 via two O-rings 288, 290, one located above the outlets 286, the other located below the outlets 286 (from the frame of reference of FIG. 7) and located within respective recesses 292, 294 in the valve body 226. The O-rings 288, 290 provide a seal between the banjo fitting 280 and the valve body 226 to prevent unwanted leakage of the pressurized gas. The hoop portion 284 is sized to provide an annular gap 296 outside the valve body 226 and between the O-rings 288, 290 to connect the outlets 286 of the third cavity 242. The cylindrical portion 278 of the banjo fitting 280 extends transverse to the longitudinal axis 202 and is hollow, defining the second inlet/outlet port 266, to support the fitting 282. The second inlet/outlet port 282 is in communication with the third cavity 242 via a channel 298 that interconnects the hoop and cylindrical portions 284, 278 of the banjo fitting. The fitting 282 is sized to accept the hose or pneumatic line 206 (FIGS. 1-3) described above with respect to the first pilot port 196.

Figure 8:
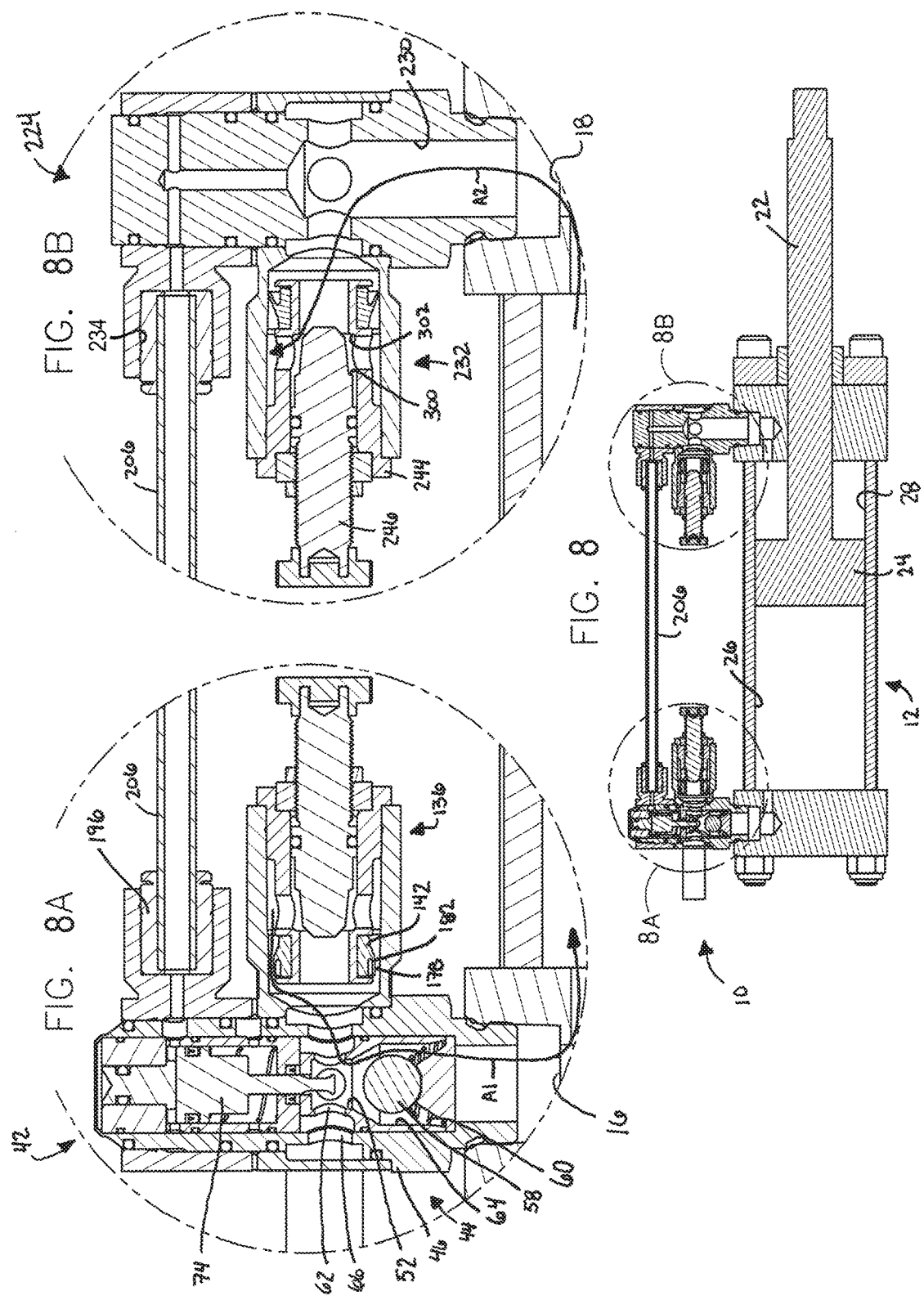
FIG. 8 is a cross-sectional view of the valve system and cylinder of FIG. 1, illustrating the cylinder during an extension operation.

The valve system 10 is operable in three modes depending upon the position of the three position valve 38: a first mode, a second mode, and a third mode. As shown in FIGS. 8, 8A, and 8B, an extension operation is performed in a first mode. In the first mode, the three position valve 38 is shifted to the second position and connects the pressurized gas source 30 to the first valve assembly 42, and the second valve assembly 224 to the exhaust 32. The first inlet/outlet port 186 functions as an inlet to direct the pressurized gas toward the first flow control valve 136. Upon entering the first banjo fitting 144 at the fitting chamber 156, the pressurized gas acts on the first side 182 of the one-way seal 142 to inwardly deflect the rim 178 of the one-way seal 142 (FIG. 8A), permitting the pressurized gas to bypass the flow control valve 136 on route to the check valve 44 (arrow A1).

Once past the flow control valve 136, the pressurized gas enters the upper cavity 62 of the check valve body 46 via the apertures 66. Upon the upper cavity 62 reaching a high enough pressure to overcome the spring force of the biasing member 60 and unseat the seal member 58 from the valve seat 52, the pressurized gas flows around the seal member 58 and flows through the lower cavity 64 in the check valve body 46 on route to the first cylinder chamber or first chamber portion 26. The increase in pressure in the first cylinder chamber 26 applies a force to the piston 24, thereby extending the rod 22. The rod 22 extends at a speed that is dependent upon the degree to which the second flow control valve 232 is opened (and the exhaust flow rate of the pressurized gas from the second cylinder chamber or second chamber portion 28 as metered by the second flow control valve 232) until the piston 24 bottoms out or stops in response to the application of a reaction force on the rod 22 equal and opposite the force applied to the piston 24 by the pressurized gas in the first cylinder chamber 26.

Simultaneously with pressurized gas entering the first cylinder chamber 26 via the first valve assembly 42 (arrow A1 in FIG. 8A), the pressurized gas within the second cylinder chamber 28 is exhausted through the second flow control valve 232 and the second inlet/outlet port 266 (i.e., functioning as an outlet port) on route to the exhaust 32 (arrow A2 in FIG. 8B). Because the second valve assembly 224 does not include a check valve, the pressurized gas in the second cylinder chamber 28 is exhausted through the flow control valve 232 at a volumetric or mass flow rate that is dependent upon the degree to which the flow control valve 232 is opened. In other words, the greater the spacing between the step 300 on the needle 246 and the seat 302 defined on the insert 244, the higher the flow rate that gas can be exhausted from the second chamber portion 28, and the smaller the spacing between the step 300 on the needle 246 and the seat 302 defined on the insert 244, the lower the flow rate that gas can be exhausted from the second chamber portion 28. Accordingly, during the extension operation shown in FIGS. 8, 8A, and 8B, the second flow control valve 232 meters the return of pressurized gas from the second cylinder chamber 28 to the exhaust 32. In practical applications, the degree to which the flow control valve 232 is opened is preset and remains unchanged during operation.

When the extensible rod 22 has translated the desired amount, or attained an equilibrium of forces acting on it, the three position valve 38 is returned to the first position, coinciding with the second mode of operation. In the second mode, the three position valve 38 connects both of the first and second inlet/outlet ports 186, 266 to the exhaust. The seal member 58 is biased against the valve seat 52 to prevent the first cylinder chamber 26 from being vented to the exhaust 32, maintaining the pressurized gas within the first cylinder chamber 26 and the resultant force acting on the piston 24 of the extensible rod 22. However, the second cylinder chamber 28 remains vented to the exhaust 32. The valve system 10 and cylinder 12 may be operated in the second mode, for example, when it is desired to maintain a clamping force on an object, with the rod 22 extended, but fluidly disconnect the first cylinder chamber 26 from the source 30 of pressurized gas.

Figure 9:
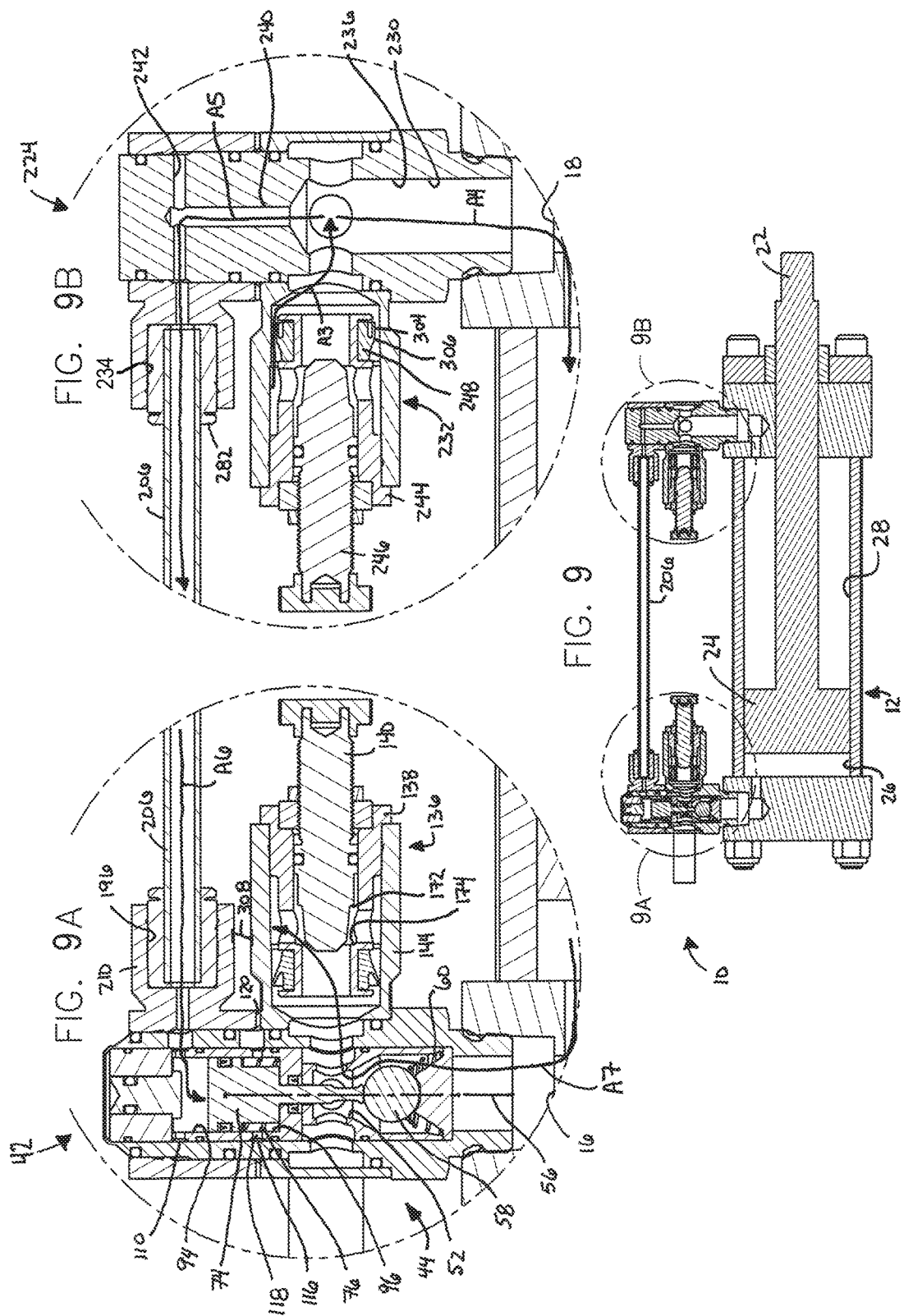
FIG. 9 is a cross-sectional view of the valve system and cylinder of FIG. 1, illustrating the cylinder during a retraction operation.

As shown in FIGS. 9, 9A, and 9B, a retraction operation is performed in the third mode. In the third mode, the three position valve 38 is shifted to the third position and connects the pressurized gas source 30 to the second valve assembly 224 and connects the first valve assembly 42 to the exhaust 32. Specifically, the second inlet/outlet port 266 functions as an inlet to direct the pressurized gas toward the second flow control valve 232. Upon entering the banjo fitting 252 at the fitting chamber 262, the pressurized gas acts on a first side 304 of the one-way seal 248 to inwardly deflect the rim 306 of the one-way seal 248 (arrow A3 in FIG. 9B), permitting the pressurized gas to bypass the second flow control valve 232 and enter the first cavity 236 of the valve body. Once in the first cavity 236, the pressurized gas branches along two paths (designated by arrows A4 and A5). On the first path (arrow A4), the pressurized gas builds pressure within the second cylinder inlet/outlet port 18 and the second cylinder chamber 28. The increase in pressure in the second cylinder chamber 28 (i.e., applied by the pressurized gas) applies a force to the piston 24, thereby retracting the rod 22. The rod 22 retracts at a speed that is dependent upon the degree to which the first flow control valve 136 is opened (and the exhaust flow rate of the pressurized gas from the first cylinder chamber 26 as metered by the first flow control valve 136) until the piston 24 bottoms out or stops in response to the application of a reaction force on the rod 22 equal and opposite the force applied to the piston by the pressurized gas in the second cylinder chamber 28.

Simultaneously, the pressurized gas continues along the second path (arrow A5), which extends from the first cavity 236 of the valve body to the second pilot port 234 and the second fitting 282 (which supports a second end of the hose 206) via the second and third cavities 240, 242. The pressurized gas enters the second end of the hose 206, traverses the hose 206, and exits the first end of the hose 206 to flood the upper circumferential recess 110 and the upper sleeve chamber 94 of the first valve assembly 42 (at arrow A6). Pressure builds within the upper sleeve chamber 94 against the top surface of the plunger 74 until the return force of the spring 76 biasing the plunger 74 is overcome, displacing the plunger 74 along the longitudinal axis 56 until it contacts and unseats the seal member 58, overcoming the spring force of the biasing member 60 and allowing pressurized gas in the first cylinder chamber 26 to vent to the exhaust 32 through the first flow control valve 136 as the second cylinder chamber 28 is simultaneously flooded with pressurized gas. A positive piston ratio (e.g., one that is greater than 1:1) of the plunger 74 allows the pressurized gas within the upper sleeve chamber 94 to overcome the backpressure in the first cylinder chamber 26 acting on the ball 58. The piston ratio is the quotient of the area of the top surface of the plunger 74 divided by the area outlined by the orifice 44. The lower sleeve chamber 96 is vented to the atmosphere via the radially extending apertures 118 through the sleeve 72, the lower circumferential recess 116 on the outer periphery of the sleeve 72, the aperture 120 in the banjo fitting 210 and check valve body 46, and an axial gap 308 defined between the banjo fittings 144, 210. Accordingly, additional gas pressure does not build in the lower sleeve chamber 96 as the plunger 74 is displaced downward within the sleeve 72. Accordingly, a pneumatic pilot circuit for actuating the plunger 74 and opening the check valve 44 is directed through the second valve assembly 224 on route to the first valve assembly 42.

Figure 10:
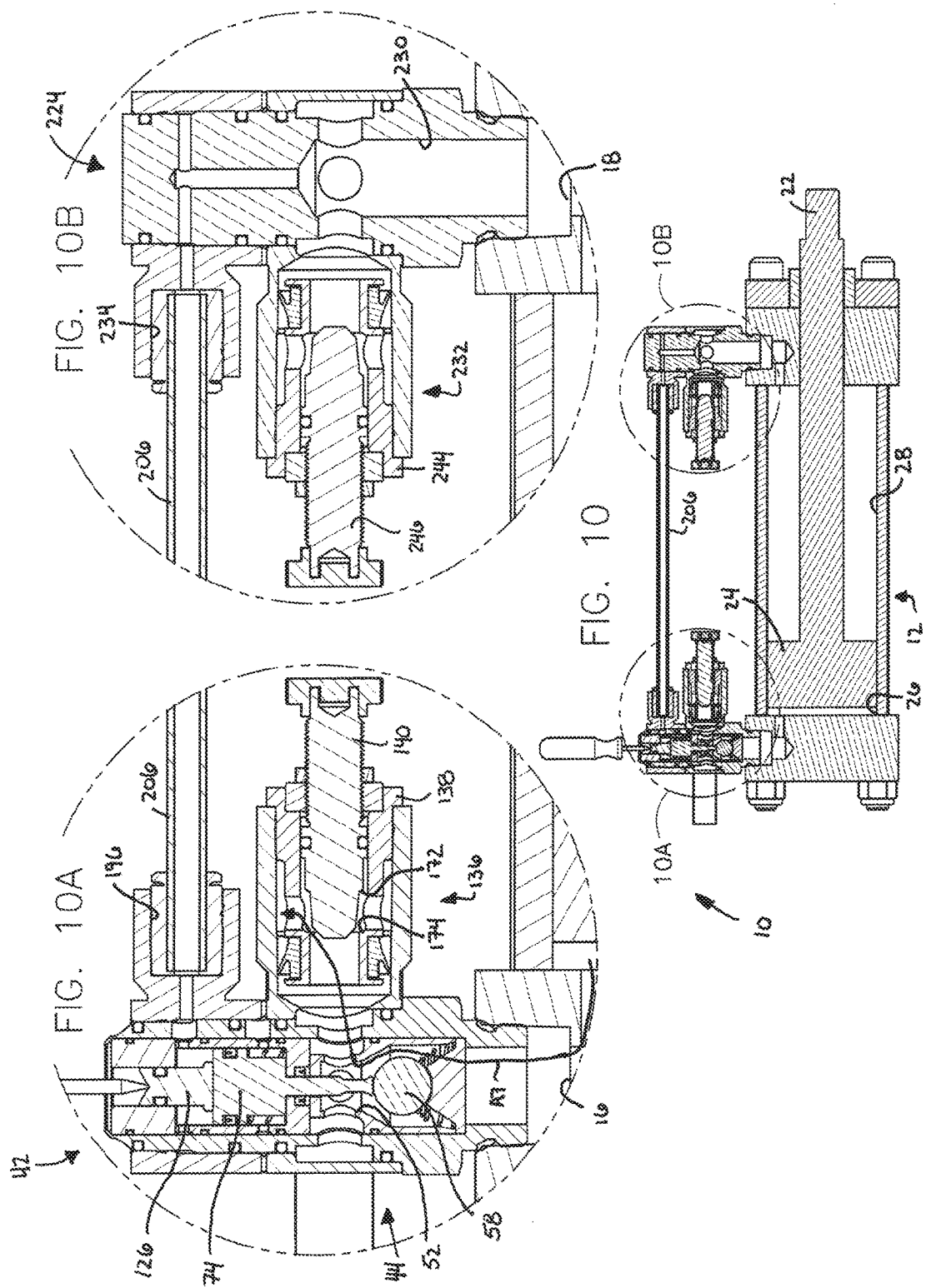
FIG. 10 is a cross-sectional view of the valve system and cylinder of FIG. 1, illustrating the cylinder pressure being vented by depressing a manual release button.

Further, as shown in FIGS. 10, 10A, and 10B, the plunger 74 may be manually actuated via operator input or contact with the button 126. When an operator depresses the button 126 (e.g., with a screwdriver, with a finger, etc.), the button 126 and plunger 74 move toward the seal member 58 in unison to unseat the seal member 58 as described above, venting pressurized gas from the first cylinder chamber 26 through the flow control valve 136 along arrow A7, to the exhaust 32 when the valve 38 is in the first position.

Regardless of the method (i.e., using a pneumatic force on the plunger 74 or a physical input of force on the plunger 74 by depressing the button 126), once the seal member 58 is unseated, the pressurized gas within the first cylinder chamber 26 is exhausted through the first flow control valve 136 and the first inlet/outlet port 186 (i.e., functioning as an outlet port) on route to the exhaust 32 (arrow A7). The pressurized gas in the first cylinder chamber 26 is exhausted through the first flow control valve 136 at a volumetric or mass flow rate that is dependent upon the degree to which the flow control valve 136 is opened. In other words, the greater the spacing between the step 172 on the needle 140 and the seat 174 defined on the insert 138, the higher the flow rate that gas can be exhausted from the first chamber portion 26, and the smaller the spacing between the step 172 on the needle 140 and the seat 174 defined on the insert 138, the lower the flow rate that gas can be exhausted from the first chamber portion 26. Accordingly, during the retraction operations shown in FIGS. 9, 9A, 9B, 10, 10A, and 10B, the first flow control valve 136 meters the return of pressurized gas from the first cylinder chamber 26 to the exhaust 32. In practical applications, the degree to which the flow control valve 136 is opened is preset and remains unchanged during operation.

When the extensible rod 22 has translated the desired amount, or attained an equilibrium of forces acting on it, the three position valve 38 is returned to the first position. As the pressure within the second valve assembly 224 and the second chamber portion 28 is exhausted, pressure within the upper sleeve chamber 94 decreases, allowing the plunger 74 and the seal member 58 to return to their biased positions. Therefore, the exhaust passage of the first chamber portion 26 past the seal member 58 is blocked, and the second cylinder chamber 28 vents to the exhaust 32 until the first and second chamber portions 26, 28 achieve equilibrium.

The valve system 10 can be tightly packaged around the cylinder 12, requiring less space for installation of the cylinder 12 in its end-use application and reducing clutter of pneumatic hoses connected to the cylinder 12. Specifically, by directing the pneumatic pilot circuit for actuating the plunger 74 through the second valve assembly 224, less hose is required for plumbing the valve assemblies 42, 224 to the cylinder 12, reducing the likelihood of a hose or fitting failure and the cylinder 12 going off-line within its end-use application.

With respect to FIGS. 11-20B, another embodiment of a valve system is shown with like features being identified with like reference numerals incremented by one-thousand. FIGS. 11-20B illustrate a valve system 1010 for use with a pneumatic cylinder 1012. The cylinder 1012 includes dual inlet/outlet ports 1016, 1018 in fluid communication with a chamber 1020 defined within the housing 1014, and an extensible rod 1022 (FIG. 13). The extensible rod 1022 includes a piston 1024 that separates the chamber 1020 into a first chamber portion 1026 and a second chamber portion 1028, the volume of each of which is variable and dependent upon the position of the piston 1024 within the chamber 1020. As described in further detail below, the valve system 1010 is operable to direct pressurized gas (e.g., air) into the first chamber portion 1026 or the second chamber portion 1028, respectively, to cause the rod 1022 to extend or retract.

With reference to FIGS. 11-17, the valve system 1010 includes a second valve assembly 1224, fluidly connected with the front inlet/outlet port 1018 of the cylinder 1012 or second cylinder port 1018, which is in fluid communication with the second chamber portion 1028. The second valve assembly 1224 includes a valve body 1226 (FIG. 15) directly attached and at least partially receivable within the front inlet/outlet port 1018 of the cylinder 1012 (FIG. 13). Specifically, the valve body 1226 includes a threaded end 1228 (FIGS. 15 and 16) having a thread form compatible with multiple different thread configurations. The valve body 1226 also includes a seal 1200 positioned adjacent the threaded end 1228 that is engageable with the opening of the inlet/outlet port 1018 to prevent leakage from the inlet/outlet port 1018. The seal 1200 may be made from a polymer or another material.

Figure 16:
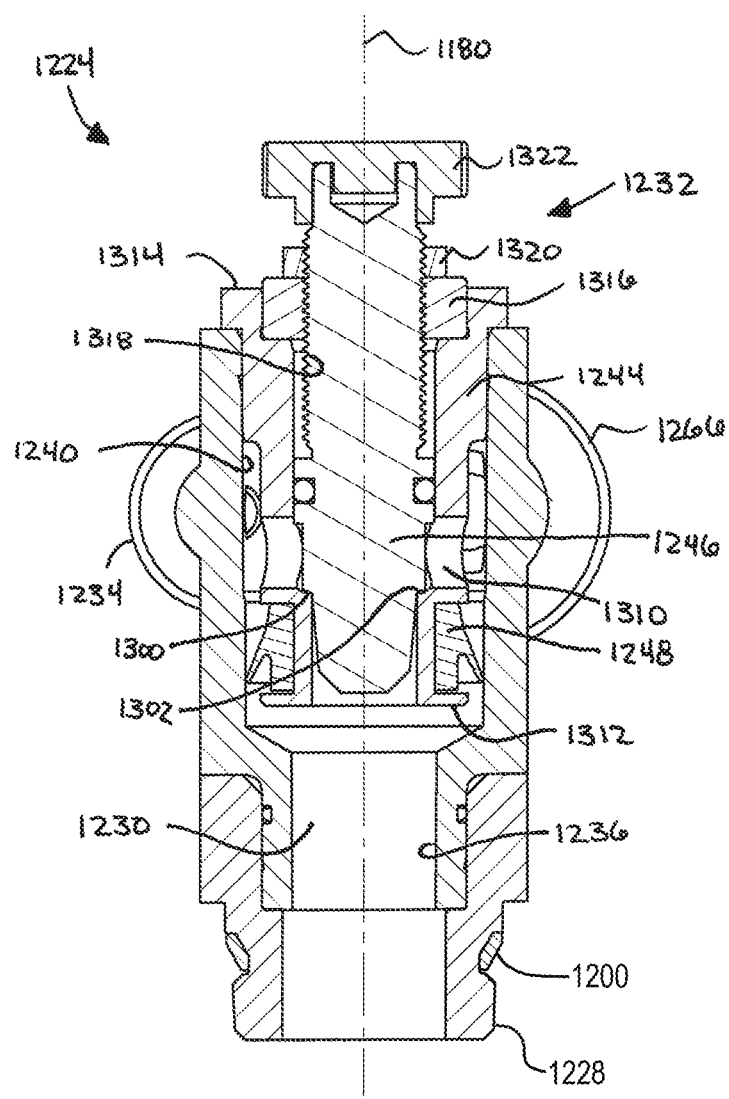
FIG. 16 is a cross-sectional view of the second valve assembly along section 16-16 in FIG. 15.
Figure 17:
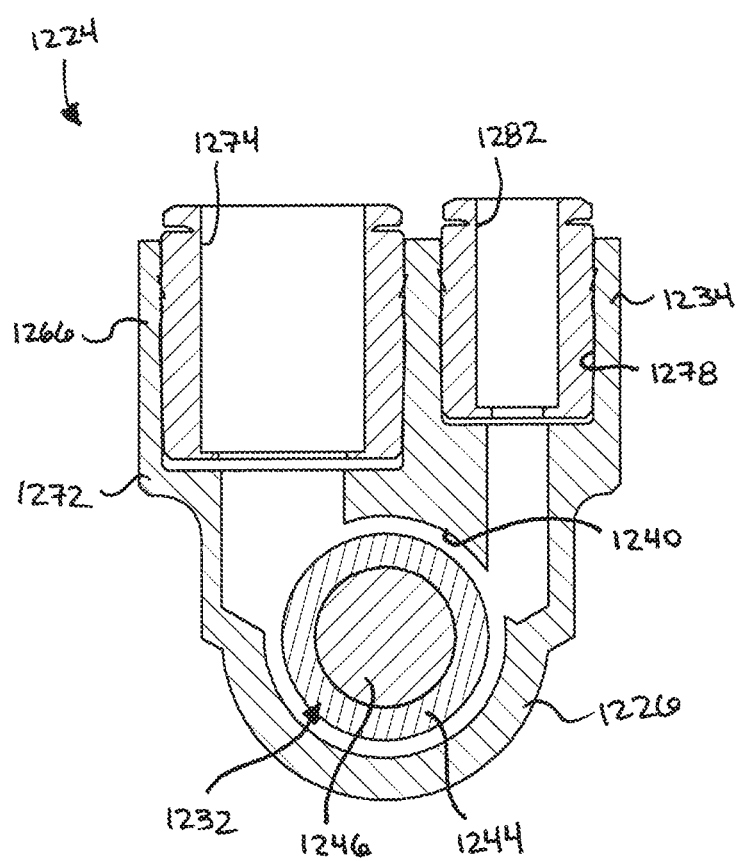
FIG. 17 is a cross-sectional view of the second valve assembly along section 17-17 in FIG. 15.

With reference to FIGS. 16 and 17, the interior of the valve body 1226 includes a chamber 1230 that provides fluid communication between the second chamber portion 1028 of the cylinder 1012, a second inlet/outlet port 1266, and a second pilot port 1234, with the inlet/outlet port 1266 and the pilot port 1234 being separated from the second chamber portion 1028 by a second flow control valve 1232 located within the chamber 1230. The second flow control valve 1232 includes an insert 1244, a valve member or needle 1246, and a one-way seal 1248.

The insert 1244 is tubular, including a stepped inside diameter, and is axially aligned with a longitudinal axis 1180 of the chamber 1230. The insert 1244 includes radially extending apertures 1310 that provide a fluid flow path between the inlet/outlet port 1266 and the interior of the insert 1244. The insert 1244 further includes respective openings at opposite ends 1312, 1314, with a first end 1312 of the insert 1244 being exposed to the second chamber portion 1028, and a second end 1314 to which an end cap 1316 is affixed and through which the needle 1246 extends. The needle 1246 includes a threaded portion 1318 engaged with corresponding threads on the end cap 1316, and a lock nut 1320 is threaded onto the threaded portion 1318 of the needle 1246 for abutting the end cap 1316 and rotationally constraining the needle 1246 relative to the end cap 1316 once the position of the needle 1246 within the insert 1244 is set. The needle 1246 also includes a knob 1322 at the distal end thereof that is graspable by an operator for setting the position of the needle 1246 within the insert 1244. The needle 1246 includes a step 1300 that rests against a seat 1302 of the insert 1244 when the needle 1246 is in a fully closed position. Fluid flow between the needle 1246 and insert 1244 is prohibited when the needle 1246 is in the fully closed position. The needle 1246 is unseated from the seat 1302 into an open position (i.e., any position except the fully closed position) by rotating the knob 1322. Fluid flow between the needle 1246 and insert 1244 is allowed when the needle 1246 is in the open position and is variable based on the displacement of the step 1300 relative to the seat 1302. As the distance between the step 1300 and the seat 1302 increases, the rate at which gas can flow between the needle 1246 and the insert 1244 also increases.

The one-way seal 1248 surrounds the insert 1244 and abuts both the insert 1244 and the valve body 1226 (defining the chamber 1230). The one-way seal 1248 is made of a resilient material, permitting the seal to selectively deflect or deform in response to the application of a gas pressure on one side of the seal 1248 to provide a flow path from the second inlet/outlet port 1266 to the front inlet/outlet port 1018, thereby bypassing the needle 1246. The one-way seal 1248 does not deform or deflect in response to the application of a gas pressure on the other side of the seal 1248, thereby preventing a gas pressure from the front inlet/outlet port 1018 from bypassing the needle 1246. In this manner, the flow control valve 1232 selectively provides a flow path between the second inlet/outlet port 1266 and the front inlet/outlet port 1018.

The chamber 1230 includes a first cavity 1236 having a lower end in fluid communication with the front inlet/outlet port 1018 and an upper end in communication with a second cavity 1240. The second cavity 1240 is connected to the first cavity via the gap between the step 1300 and the seat 1302 when the needle 1246 is in an open position, and selectively via the one-way seal 1248 (i.e., when the one-way seal 1248 is deformed). The second cavity 1240 is delimited by the valve body 1226, the insert 1244, and the one-way seal 1248 and is exposed directly to the pilot port 1234 and inlet/outlet port 1266. As shown in FIG. 17, the second cavity 1240 has an annular cross-sectional shape and fluidly connects the pilot port 1234 and the inlet/outlet port 1266, such that fluid flow between the inlet/outlet port 1266 and the pilot port 1234 is permitted around the flow control valve 1232 regardless of the position of the needle 1246.

Figure 11:
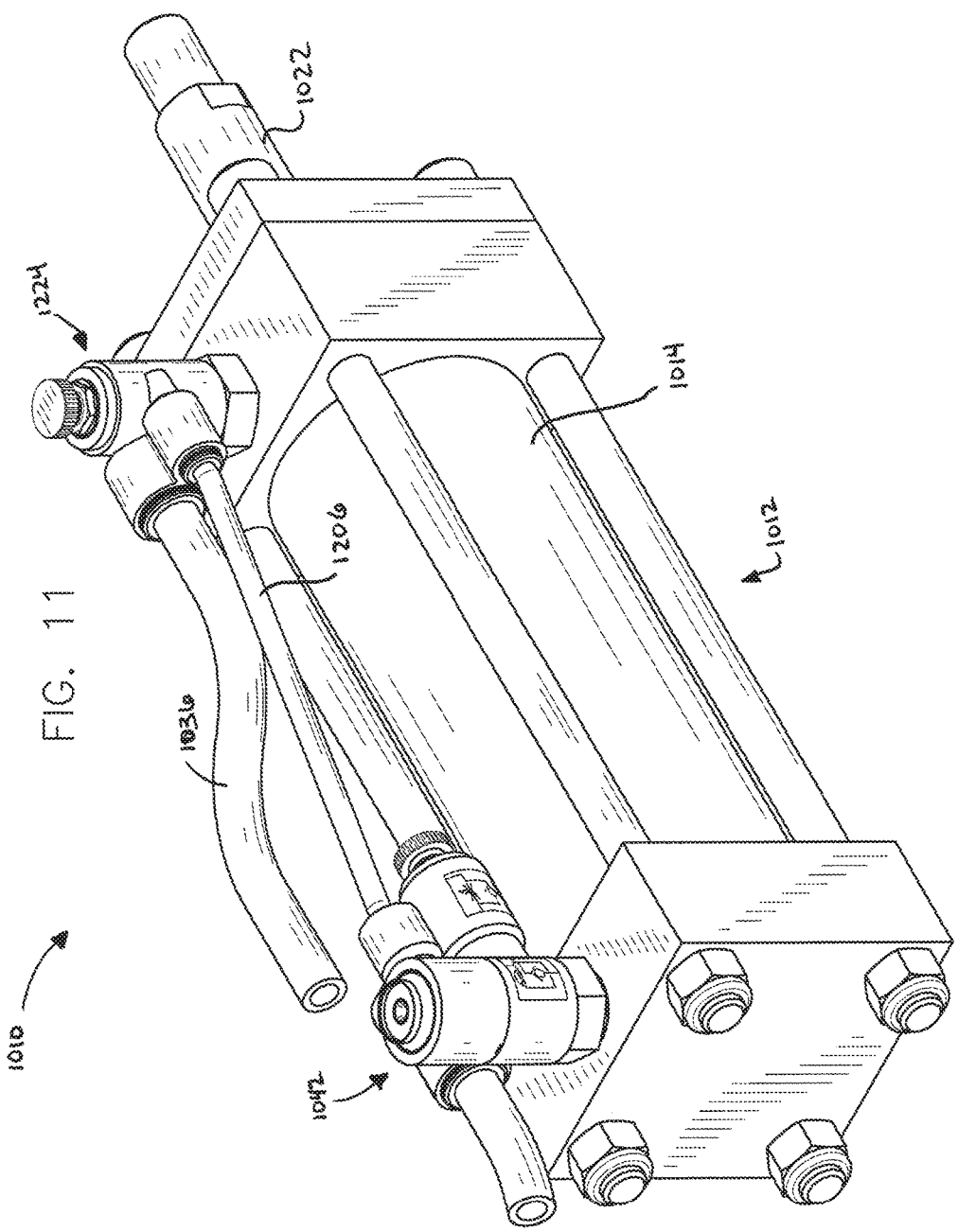
FIG. 11 is a perspective view of a valve system in accordance with another embodiment of the invention for use with a cylinder.
Figure 12:
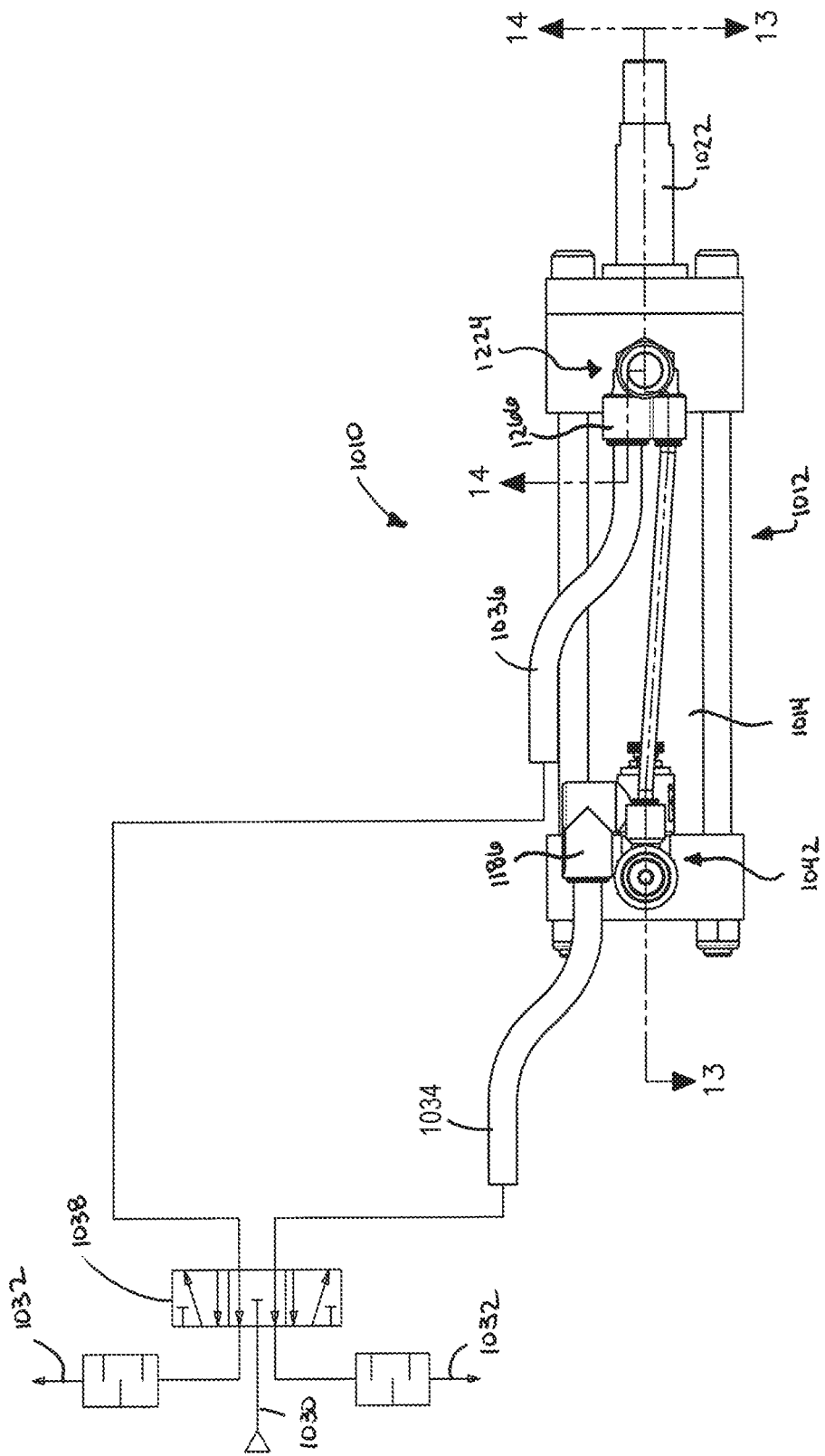
FIG. 12 is a top view of the valve system and cylinder of FIG. 11 with a schematic representation of adjoining valve structure.
Figure 15:
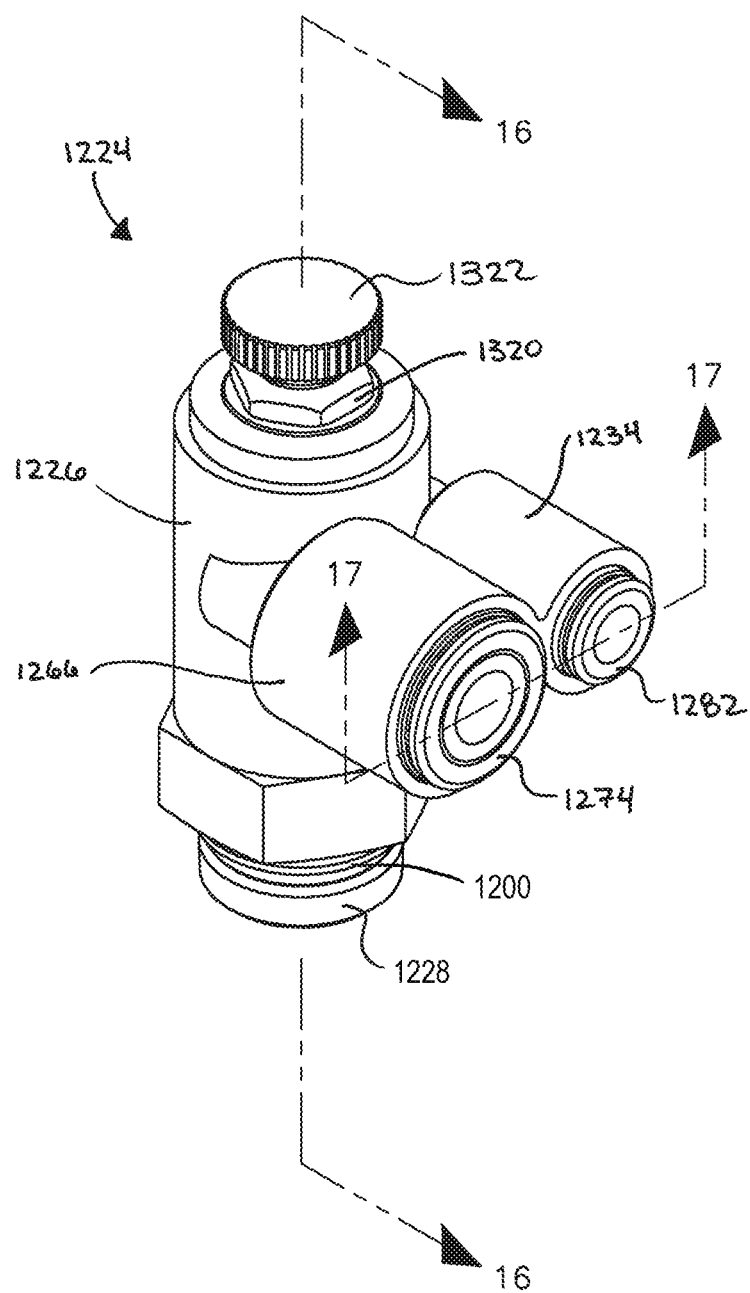
FIG. 15 is a perspective view of a second valve assembly of the valve system of FIG. 11.

As shown in FIGS. 15 and 17, the second inlet/outlet port 1266 is formed integrally with the valve body 1226. The second inlet/outlet port 1266 communicates with the three position valve 1038 via the hose 1036 (FIGS. 11 and 12). When connected to the exhaust 1032, the second inlet/outlet port 1266 functions as an outlet to allow pressurized gas to exhaust from the second chamber portion 1028 of the cylinder 1012, through the chamber 1230 of the valve body 1226, through the second flow control valve 1232, and through the second inlet/outlet port 1266 before being discharged to the exhaust 1032. When connected to the air supply 1030, the second inlet/outlet port 1266 functions as an inlet to allow pressurized gas to flow through the second inlet/outlet port 1266, through the second flow control valve 1232, and through the chamber 1230 of the valve body 1226 before reaching the second chamber portion 1028 of the cylinder 1012. With reference to FIG. 17, the inlet/outlet port 1266 includes a stepped region 1272 sized to receive a quick-lock fitting 1274 (e.g., a push-lock fitting) for connecting the hose 1036 (i.e., from the three position valve 1038) to the inlet/outlet port 1266. Such a push-lock fitting 1274 is commercially available from Camozzi Pneumatics, Inc. of McKinney, Tex., United States of America.

With continued reference to FIGS. 15 and 17, the second pilot port 1234 is also formed integrally with the valve body 1226. The second pilot port 1234 includes a hollow cylindrical portion 1278 in which a fitting 1282 (e.g., a push-lock fitting like fitting 1274) is received. The fitting 1282 is sized to accept a hose or pneumatic line 1206 (FIGS. 11-13), the hose 1206 additionally connected to a first pilot port 1196 (FIG. 18A) of a first valve assembly 1042.

Figure 18:
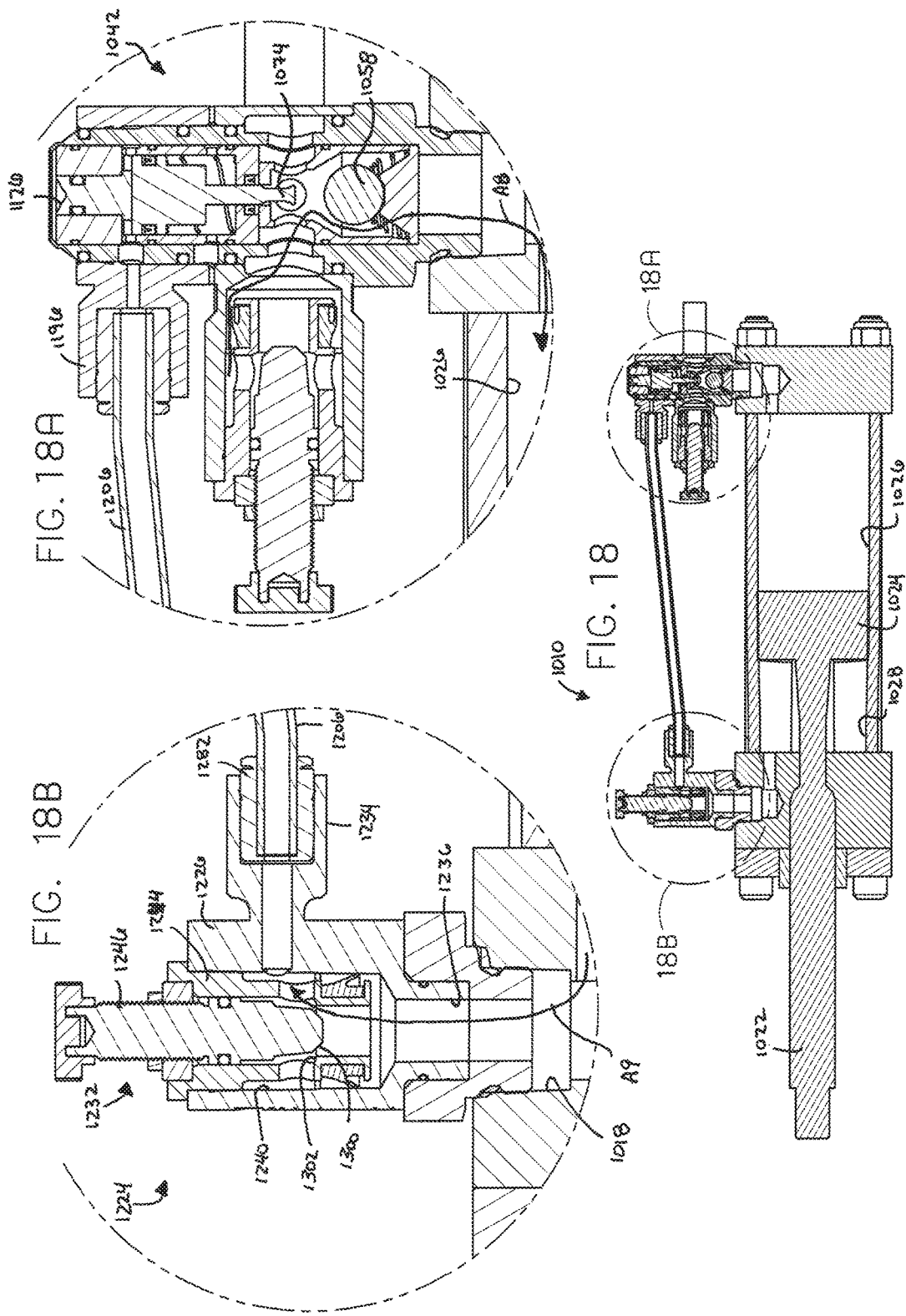
FIG. 18 is a cross-sectional view of the valve system and cylinder of FIG. 11, illustrating the cylinder during an extension operation.

Like the valve system 10 described above, the valve system 1010 is operable in three modes depending upon the position of the three position valve 1038: a first mode, a second mode, and a third mode. As shown in FIGS. 18, 18A, and 18B, an extension operation is performed in a first mode. In the first mode, the three position valve 1038 is shifted to the second position and connects the pressurized gas source 1030 to the first valve assembly 1042, and the second valve assembly 1224 to the exhaust 1032. The first valve assembly 1042 functions in the same manner as described above with respect to the first mode of valve system 10. Pressurized gas from the first valve assembly 1042 flows into the first chamber portion 1026. The increase in pressure in the first cylinder chamber 1026 applies a force to the piston 1024, thereby extending the rod 1022. The rod 1022 extends at a speed that is dependent upon the degree to which the second flow control valve 1232 is opened until the piston 1024 bottoms out or stops in response to the application of a reaction force on the rod 1022 equal and opposite the force applied to the piston 1024 by the pressurized gas in the first cylinder chamber 1026.

Simultaneously with pressurized gas entering the first cylinder chamber 1026 via the first valve assembly 1042 (arrow A8 in FIG. 18A), the pressurized gas within the second cylinder chamber 1028 is exhausted through the second flow control valve 1232 and the second inlet/outlet port 1266 (FIG. 14; i.e., functioning as an outlet port) on route to the exhaust 1032 (arrow A9 in FIG. 18B). Because the second valve assembly 1224 does not include a check valve, the pressurized gas in the second cylinder chamber 1028 is exhausted through the flow control valve 1232 at a volumetric or mass flow rate that is dependent upon the degree to which the flow control valve 1232 is opened. In other words, the greater the spacing between the step 1300 on the needle 1246 and the seat 1302 defined on the insert 1244, the higher the flow rate that gas can be exhausted from the second chamber portion 1028, and the smaller the spacing between the step 1300 on the needle 1246 and the seat 1302 defined on the insert 1244, the lower the flow rate that gas can be exhausted from the second chamber portion 1028. Accordingly, during the extension operation shown in FIGS. 18, 18A, and 18B, the second flow control valve 1232 meters the return of pressurized gas from the second cylinder chamber 1028 to the exhaust 1032. In practical applications, the degree to which the flow control valve 1232 is opened is preset and remains unchanged during operation.

When the extensible rod 1022 has translated the desired amount, or attained an equilibrium of forces acting on it, the three position valve 1038 is returned to the first position, coinciding with the second mode of operation. In the second mode, the three position valve 1038 connects both of the first and second inlet/outlet ports 1186, 1266 (FIG. 12) to the exhaust. The valve system 1010 and cylinder 1012 may be operated in the second mode, for example, when it is desired to maintain a clamping force on an object, with the rod 1022 extended, but fluidly disconnect the first cylinder chamber 1026 from the source 1030 of pressurized gas.

Figure 19:
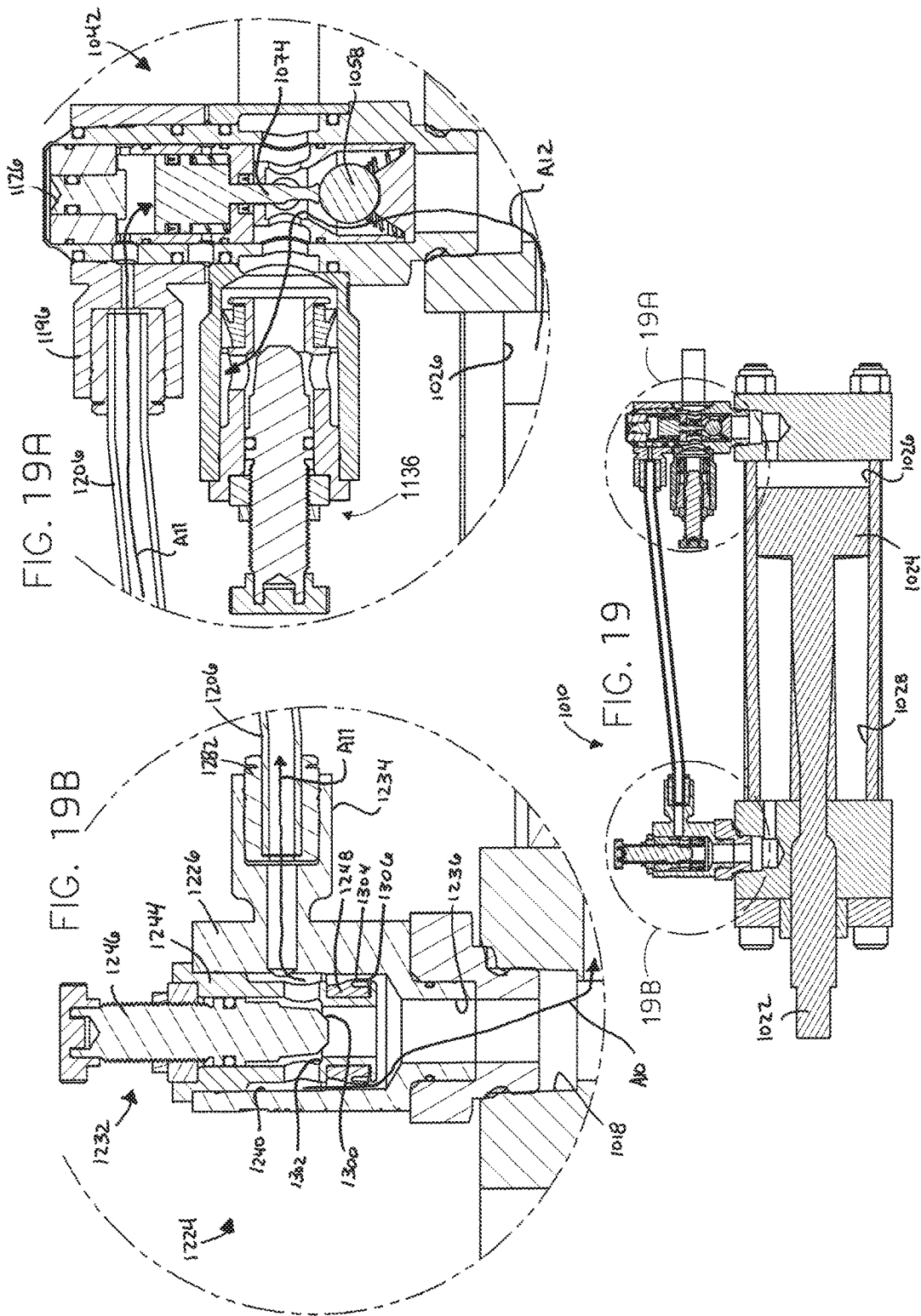
FIG. 19 is a cross-sectional view of the valve system and cylinder of FIG. 11, illustrating the cylinder during a retraction operation.

As shown in FIGS. 19, 19A, and 19B, a retraction operation is performed in the third mode. In the third mode, the three position valve 1038 is shifted to the third position and connects the pressurized gas source 1030 to the second valve assembly 1224 and connects the first valve assembly 1042 to the exhaust 1032. Specifically, the second inlet/outlet port 1266 functions as an inlet to direct the pressurized gas toward the second flow control valve 1232. Upon entering the second inlet/outlet port 1266, the pressurized gas passes to the second cavity 1240 and acts on a first side 1304 of the one-way seal 1248 to inwardly deflect the rim 1306 of the one-way seal 1248 (arrow A10 in FIG. 19B), permitting the pressurized gas to bypass the second flow control valve 1232 and enter the first cavity 1236 of the valve body 1226. Once in the first cavity 1236, the pressurized gas builds pressure within the second cylinder inlet/outlet port 1018 and the second cylinder chamber 1028. The increase in pressure in the second cylinder chamber 1028 (i.e., applied by the pressurized gas) applies a force to the piston 1024, thereby retracting the rod 1022. The rod 1022 retracts at a speed that is dependent upon the degree to which the first flow control valve 1136 is opened until the piston 1024 bottoms out or stops in response to the application of a reaction force on the rod 1022 equal and opposite the force applied to the piston by the pressurized gas in the second cylinder chamber 1028.

Simultaneously, the pressurized gas continues along a second path (arrow A11), which extends around the flow control valve 1232 and through the second cavity 1240 of the valve body 1226, to the second pilot port 1234 and the second fitting 1282 (which supports a second end of the hose 1206). The pressurized gas enters the second end of the hose 1206, traverses the hose 1206, and exits the first end of the hose 1206 to displace the plunger 1074 and unseat the seal member 1058 in a manner similar to that described above with respect to the third mode of valve system 10. Pressurized gas within the first cylinder chamber 1026 is vented to the exhaust 1032, past the unseated seal member 1058 and through the first flow control valve 1136 (arrow A12 in FIG. 19A) as the second cylinder chamber 1028 is simultaneously flooded with pressurized gas (arrow A10).

As shown in FIGS. 19, 19A, and 19B, when the extensible rod 1022 has translated the desired amount, or attained an equilibrium of forces acting on it, the three position valve 1038 is returned to the first position. As the pressure within the second valve assembly 1224 and the second chamber portion 1028 is exhausted, pressure within the hose 1206 decreases, allowing the plunger 1074 and the seal member 1058 to return to their biased positions. Therefore, the second cylinder chamber 1028 vents to the exhaust 1032 until the first and second chamber portions 1026, 1028 achieve equilibrium.

Figure 20:
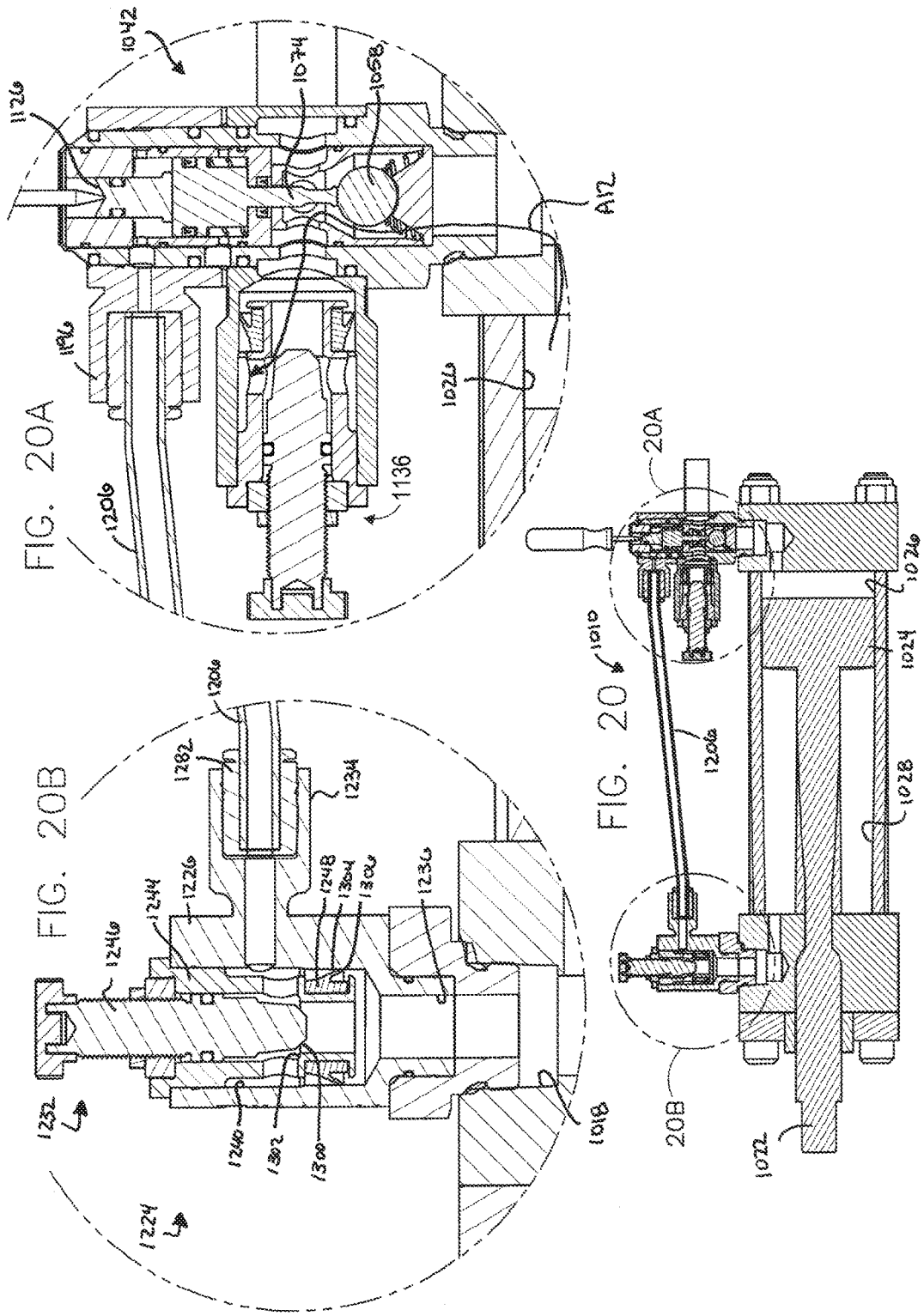
FIG. 20 is a cross-sectional view of the valve system and cylinder of FIG. 11, illustrating the cylinder pressure being vented by depressing a manual release button.

Further, as shown in FIGS. 20, 20A, and 20B, the plunger 1074 may be manually actuated via operator input or contact with the button 1126. When an operator depresses the button 1126 (e.g., with a screwdriver, with a finger, etc.), the button 1126 and plunger 1074 move toward the seal member 1058 in unison to unseat the seal member 1058 as described above, venting pressurized gas from the first cylinder chamber 1026 through the flow control valve 1136 along arrow A12, to the exhaust 1032 when the valve 1038 is in the first position.

Figure 21:
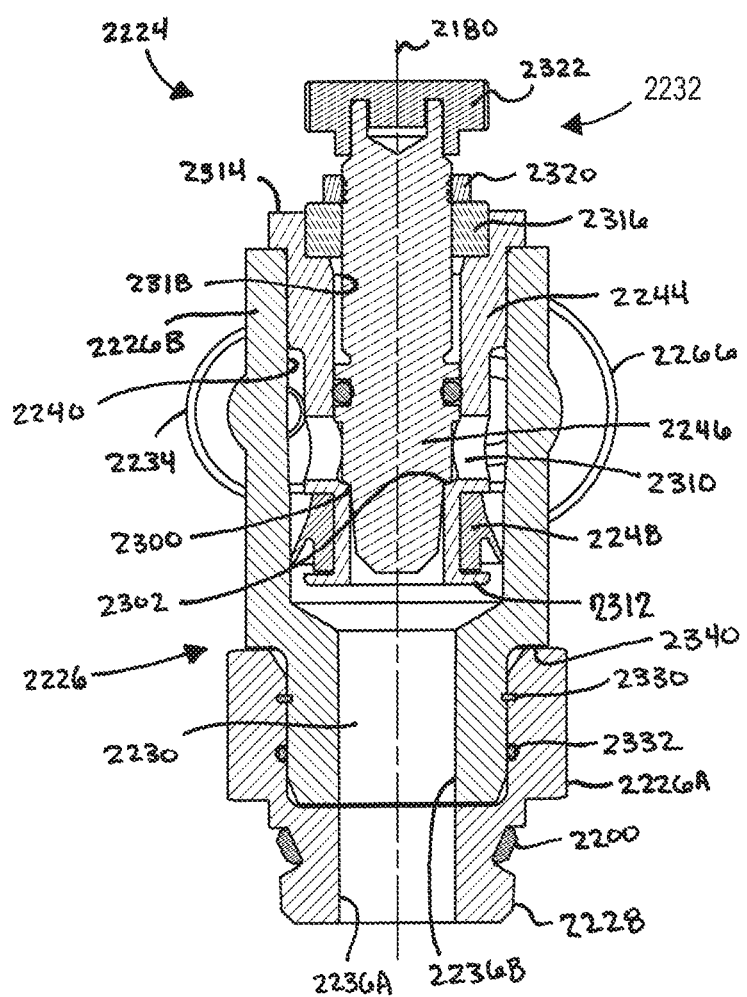
FIG. 21 is a cross-sectional view of a second valve assembly according to another embodiment.

With respect to FIG. 21, another embodiment of a second valve assembly 2224 is shown with like features being identified with like reference numerals incremented by one-thousand (relative to the embodiment shown in FIGS. 11-20B). FIG. 21 illustrates a second valve assembly 2224 for use with a pneumatic cylinder, such as one of the pneumatic cylinders 12, 1012 described above. The second valve assembly 2224 is fluidly connected with an inlet/outlet port of the pneumatic cylinder.

The second valve assembly 2224 includes a valve body 2226 comprising a first valve body portion 2226A and a second valve body portion 2226B. The first valve body portion 2226A is directly attached and at least partially receivable within the inlet/outlet port of the cylinder. Specifically, the first valve body portion 2226A includes a threaded end 2228 having a thread form compatible with multiple different thread configurations. The first valve body portion 2226A also includes a seal 2200 positioned adjacent the threaded end 2228 that is engageable with the opening of the inlet/outlet port to prevent leakage from the inlet/outlet port.

The second valve body portion 2226B is a stepped cylinder including an external step 2340 located at the demarcation between a first diameter and a second diameter (less than the first diameter) of the second valve body portion 2226B. The second valve body portion 2226B is at least partially receivable within the first valve body portion 2226A. More specifically, the second valve body portion 2226B with the second diameter is receivable within the first valve body portion 2226A such that the step 2340 rests against or maintains a clearance relative to the first valve body portion 2226A. Further, a retaining clip 2330 interconnects the first and second valve body portions 2226A, 2226B, and a seal (e.g., an O-ring) 2332 is located between the first and second valve body portions 2226A, 2226B to prevent leakage between the valve body components. The retaining clip 2330 axially retains the first and second valve body portions 2226A, 2226B, yet permits the second valve body portion 2226B to swivel or rotate relative to the first valve body portion 2226A about axis 2180. As a result, the second valve body portion 2226B can be swiveled to orient the inlet/outlet port 2266 and the second pilot port 2234 toward the direction from which the respective hoses (i.e., hoses 1036, 1206) are coming for attachment to the inlet/outlet port 2266 and the second pilot port 2234.

The interior of the second valve body portion 2226B includes a chamber 2230 that provides fluid communication between the cylinder, the second inlet/outlet port 2266, and the second pilot port 2234, with the inlet/outlet port 2266 and the pilot port 2234 being separated from the second chamber portion 2230 by a second flow control valve 2232 located within the chamber 2230. The second flow control valve 2232 includes an insert 2244, a valve member or needle 2246, and a one-way seal 2248. The insert 2244 is axially insertable along the axis 2180 into the second valve body portion 2226B, thereby defining three chambers or cavities within the second valve assembly 2224.

The chamber 2230 includes a first cavity 2236A having a lower end in fluid communication with the front inlet/outlet port and an upper end in communication with a second cavity 2236B. The second cavity 2236B has an upper end in communication with a third cavity 2240. The third cavity 2240 is connected to the second cavity 2236B via a gap in the flow control valve 2232 when the needle 2246 is in an open position, and selectively via the one-way seal 2248 (i.e., when the one-way seal 2248 is deformed). The third cavity 2240 is delimited by the valve body 2226, the insert 2244, and the one-way seal 2248 and is exposed directly to the pilot port 2234 and inlet/outlet port 2266. The third cavity 2240 has an annular cross-sectional shape and fluidly connects the pilot port 2234 and the inlet/outlet port 2266, such that fluid flow between the inlet/outlet port 2266 and the pilot port 2234 is permitted around the flow control valve 2232 regardless of the position of the needle 2246.

The second inlet/outlet port 2266 is formed integrally with the second valve body portion 2226B. The second inlet/outlet port 2266 communicates with a three position valve (e.g., the valve 38, 1038) via a hose (e.g., hose 36, 1036). The second pilot port 2234 is likewise formed integrally with the second valve body portion 2226B. The second pilot port 2234 includes a hollow cylindrical portion in which a fitting (e.g., a push-lock fitting like fitting 274, 1274) is received. The fitting is sized to accept a hose or pneumatic line, the hose additionally connected to a first valve assembly (e.g., valve assembly 42, 1042).

Figure 23A:
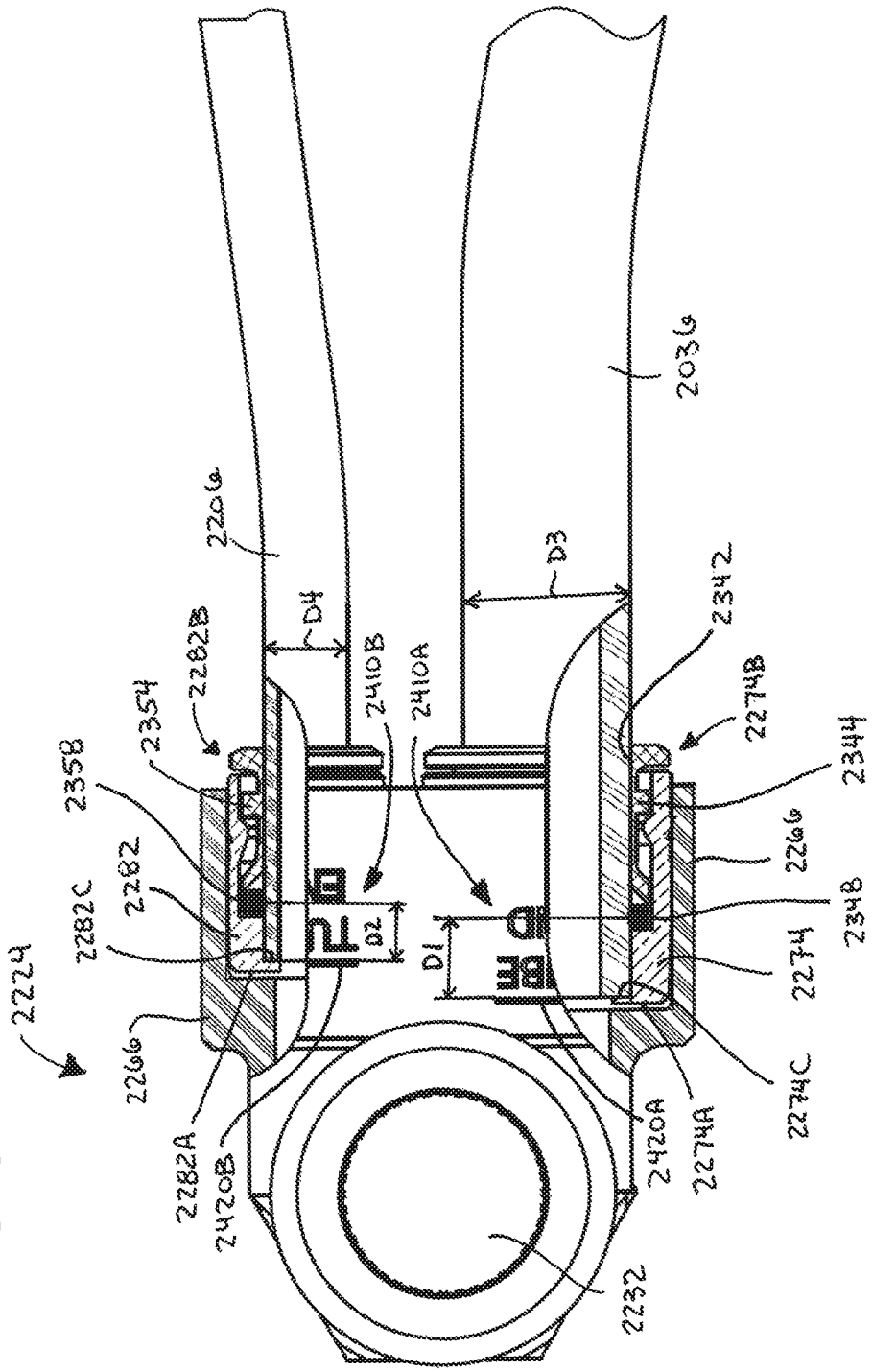
FIG. 23A is a top view of the second valve assembly of FIG. 22.
Figure 24:
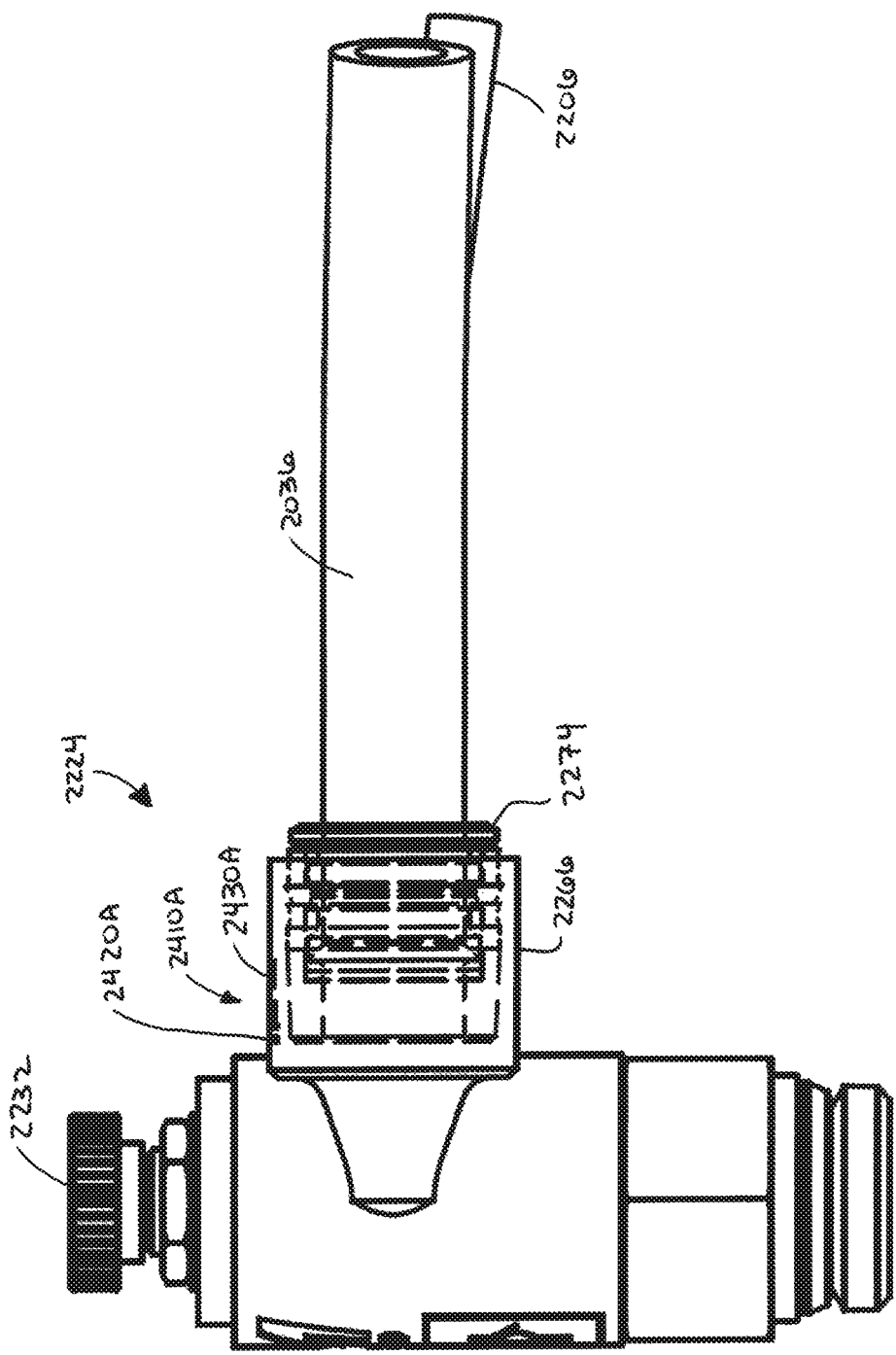
FIG. 24 is a side view of the second valve assembly of FIG. 22.
Figure 25:
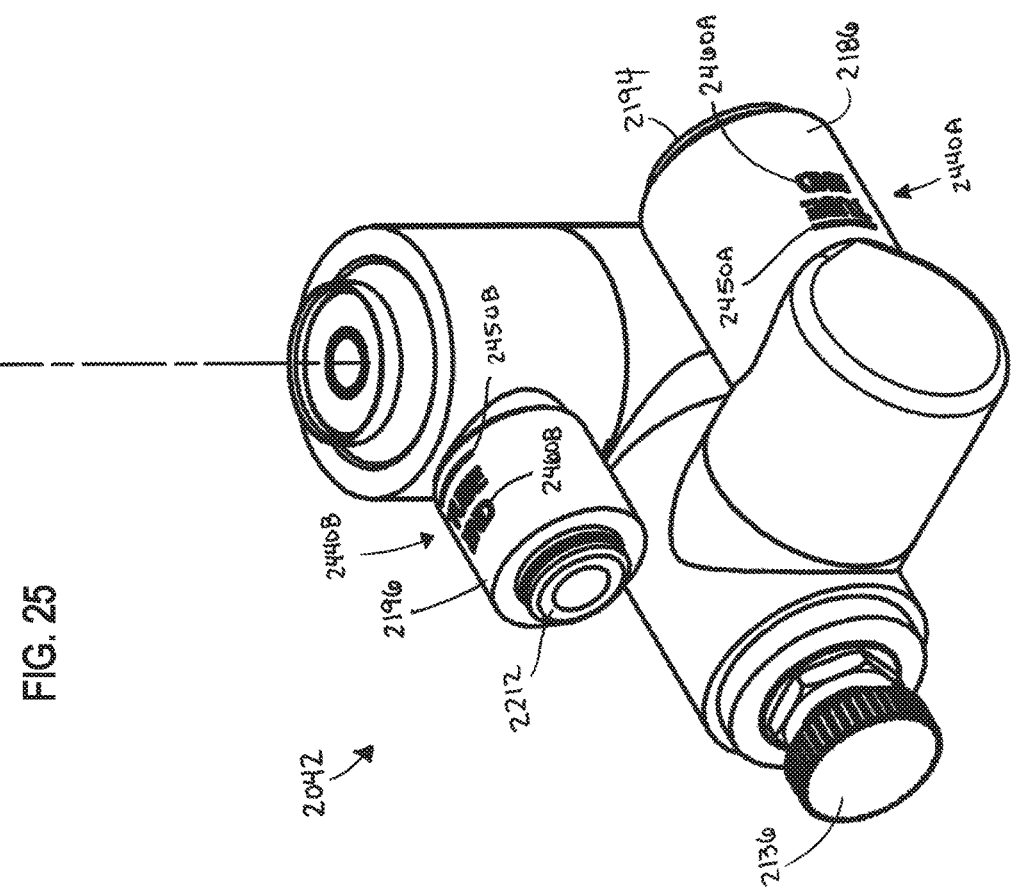
FIG. 25 is a perspective view of a first valve assembly.

As shown in FIGS. 22-24, the inlet/outlet port 2266 and the second pilot port 2234 may be provided with reference indicia 2410A, 2410B. The reference indicia 2410A, 2410B may be etched, engraved, embossed, stamped, or applied via an adhesive or fastener onto the outer surface of the respective port 2266, 2234. Each reference indicia 2410A, 2410B includes a reference line 2420A, 2420B extending partially around the circumference of the respective port 2266, 2234. Alternatively, the lines 2420A, 2420B may extend around the entirety of the circumference of the respective ports 2266, 2234. Each reference indicia 2410A, 2410B further includes a textual indicator 2430A, 2430B that identifies the meaning of the lines 2420A, 2420B. The textual indicators 2430A, 2430B shown in FIGS. 22, 23A, and 23B recite "TUBE END," indicating that the respective line 2420A, 2420B demarcates a depth to which a tube or hose should be inserted into the port 2266, 2234. For example, the line 2420A on the inlet/outlet port 2266 indicates a depth to which a pneumatic line similar to pneumatic lines 36, 1036 should be inserted into the port 2266. The line 2420B on the pilot port 2234 indicates a depth to which a hose or pneumatic line, similar to the pneumatic lines 206, 1206 should be inserted into the port 2234. Though shown with respect to the second pilot port 2234 and inlet/outlet port 2266, reference indicia may alternatively or additionally provided on a first pilot port (such as the first pilot port 2196) and a first inlet/outlet port (such as the first inlet/outlet ports 2186), as shown in FIGS. 25-27.

As shown in FIG. 23A, the reference line 2420B indicates a depth that is at a stable or sealing depth (i.e., a depth at which leaking is prevented or minimized, such as a depth extending past a sealing member/O-ring, as described below with respect to FIG. 23A). Alternatively, the reference line 2420B may indicate a depth that is a maximum or near-maximum available depth (e.g., within 10% of the maximum available depth) for a tube inserted into the second pilot port 2234. The second pilot port 2234 may be designed such that the maximum or near-maximum available depth is likewise a stable depth.

The implementation of reference indicia 2410A, 2410B on the ports 2234, 2266 removes an amount of guesswork or potentially inaccurate measurements when cutting a tube to length. For example, as shown in FIGS. 20, 20A, and 20B, a tube 1206 of the completed valve system 1010 extends between the first and second pilot ports 1196, 1234. In order to assemble the valve system 1010, a user cuts the tube 1206 to length to extend into the pilot ports 1196, 1234. Without reference indicia, this process requires measuring the distance between the internal surfaces of the pilot ports 1196, 1234 which may require specialized tools.

If both of the first and second pilot ports 1196, 1234 are provided with reference indicia (such as the reference indicia 2410A, 2410B), a user is able to hold one end of the tube 1206 against the reference indicia, and specifically against the line of the first pilot port 2196 (FIGS. 24-26) and extend the length of the tube 1206 to the line 2420B of the second pilot port 2234. Marking the placement of the tube 1206 that lines up with the second line 2420B provides the cut point such that the tube 1206 has the appropriate length to be seated properly within the pilot ports 2196, 2234 (i.e., is seated to a stable depth in both pilot ports 2196, 2234). Alternatively, instead of marking the cut point, the user may cut the tube 1206 directly based on the visual cue provided by the line 2420B.

If only one of the pilot ports 2196, 2234 (e.g., only the second pilot port 2234) is provided with reference indicia 2410B, a user is able to insert a first end of the tube 1206 into the first pilot port 2196, seating the tube 1206 to the appropriate depth (i.e., the stable depth, the maximum available depth). The user then extends the length of the tube 1206 to the line 2420B of the second pilot port 2234. Similar to the method described above, marking the placement of the tube 1206 that lines up with the line 2420B provides the cut point such that the tube 1206 has the appropriate length to be seated properly within the pilot ports 2196, 2234. With the appropriate tube length to be seated properly in the ports 2196, 2234, the user is then able to install the tube 1206 an adequate depth to avoid or minimize leakages at the ports 2196, 2234.

Further, with respect to the reference indicia 2410A shown on the inlet/outlet port 2266 (FIGS. 22-23B), and further with reference to FIG. 12, the length of the pneumatic lines 1034, 1036 is defined as the distance between the valve 1038 and the respective inlet/outlet port 2186 (FIGS. 25-27), 2266 (FIGS. 22-24). The length of the tubes 1034, 1036 can be accurately cut based on the use of the reference indicia 2410A, and specifically the line 2420A. The process below is described with reference to the pneumatic line 1036, though the process applies equally to the pneumatic line 1034. The user first fixes a first end of the tube 1036 to the valve 1038. The user then extends the length of the tube 1036 to the line 2420A of the second inlet/outlet port 2266. Marking the placement of the tube 1036 that lines up with the second line 2420A provides the cut point such that the tube 1036 has the appropriate length to be seated properly within the inlet/outlet port 2266. The user is then able to install the tube 1036 an adequate depth to avoid or minimize leakages at the inlet/outlet port 2266.

FIG. 23A shows a partial cross-section of the second valve assembly 2224 including a partial cross-section of the fittings 2274, 2282, (e.g., push-lock fittings). The fitting 2274 of the second inlet/outlet port 2266 includes a first (internal) end 2274A that is positioned within and may abut the interior of the port 2266. As shown, the first end 2274A includes an abutment 2274C, functioning as a stop for the tube 2036.

A second (external) end 2274B is opposite the first end 2274 and includes an aperture (i.e., having an inside diameter) 2342 for accepting the tube 2036. A retainer 2344 extends from the second end 2274B to an O-ring 2348 positioned between the first and second ends 2274A, 2274B. The retainer 2344 firmly guides the tube 2036 as it is inserted through the aperture 2342 into the fitting 2274, and also maintains the axial position of the O-ring 2348 within the fitting 2274. The tube 2036 is inserted such that the end of the tube 2036 extends beyond the O-ring 2348 to provide a seal at the interface between the tube 2036 and the O-ring 2348.

When the fitting 2274 is seated within the inlet/outlet port 2266, the O-ring 2348 is spaced apart from the reference line 2420A by a distance D1. The distance D1 is defined as the distance between a center of the O-ring 2348 and a nearest edge of the reference line 2420A, as shown in FIG. 23A. The distance D1 may be at least 0.1 inches and may be between 0.1 and 0.3 inches (e.g., 0.178", 0.182", 0.184", 0.236", 0.239", 0.250") depending upon the inside diameter 2342 of the fitting 2274 or the outside diameter of the mating tube 2036. Further, the distance D1 may be described as a function of the outside diameter D3 of the tube 2036. As shown, the distance D1 may be at least fifty percent of the outside diameter D3 of the tube 2036 and may be between fifty and one-hundred percent (e.g., 50 percent, 56.5 percent, 58.2 percent. 59.9 percent, 63.7 percent, 73.6 percent, 75.3 percent). For example, if the tube 2036 has an outside diameter of 0.500 inches, the distance D1 may be 0.250 inches, or fifty percent the outside diameter of the tube 2036.

As shown in FIG. 23A, the tube 2036 is cut perpendicular to the centerline of the tube 2036. However, if the tube 2036 is erroneously cut at an angle (e.g., upward of 15 degrees, 30 degrees, or 45 degrees from perpendicular to the centerline), as shown in FIG. 23B, the tube 2036 will still seal within the fitting 2274 because the cut reference line 2420A is spaced the distance D1 away from the sealing O-ring 2348 as long as the distance D1 is greater than or equal to $D3*\tan(\alpha)$ where $\alpha$ is the angle of the cut relative to a normal cut perpendicular to the centerline of the tube 2036.

The fitting 2282 includes a similar retainer 2354 and O-ring 2358 (positioned between first and second ends 2282A, 2282B) for guiding the pneumatic line 2206 and providing a seal at the interface between the pneumatic line 2206 and the O-ring 2358. Similar to the fitting 2274 and the inlet/outlet port 2266, when the fitting 2282 is seated within the pilot port 2234, the O-ring 2358 is spaced apart from the reference line 2420B by a distance D2, the distance D2 being at least 0.1 inches and at least fifty percent of the outside diameter D4 of the line 2206.

FIGS. 25-27 illustrate a first valve assembly 2042 including the first pilot port 2196 and first inlet/outlet port 2186. Similar to the second valve assembly 2224 shown in FIGS. 22-24, the first valve assembly 2042 is provided with reference indicia 2440A, 2440B coinciding with the tube end, as described above. Each reference indicia 2440A, 2440B includes a line 2450A, 2450B and a textual indicator 2460A, 2460B to demarcate the stable depth for insertion of the respective lines or tubes 1034, 1206.

FIGS. 28-30 illustrate a second valve assembly 3224, similar to the valve assembly 224, except as otherwise described. The second valve assembly 3224 is provided with reference indicia 3410A, 3410B coinciding with the tube end, as described above. Each reference indicia 3410A, 3410B includes a line 3420A, 3420B and a textual indicator 3430A, 3430B to demarcate the stable depth for insertion of the respective lines or tubes (such as pneumatic lines 36, 206 shown in FIG. 1).

Various features of the invention are set forth in the following claims.

What is claimed is:

1. A valve system for use with a cylinder having an extensible rod, the valve system comprising:
   a first valve assembly including
      a first inlet/outlet port,
      a check valve biased toward a closed state, the check valve having a check valve body at least partially receivable within a first port of the cylinder,
      a flow control valve positioned in series between the first inlet/outlet port and the check valve, and
      a first pilot port selectively communicable with a source of pressurized gas for opening the check valve; and
   a second valve assembly including
      a second inlet/outlet port,
      a second pilot port through which the pressurized gas must flow before being introduced to the first pilot port,
      a valve body at least partially receivable within a second port of the cylinder, wherein the second inlet/outlet port and the second pilot port are integrally formed as a single piece as a portion of the valve body, and
      an annular cavity defined within the valve body that provides a fluid path between the second pilot port and the second inlet/outlet port.

2. The valve system of claim 1, further comprising a hose interconnecting the first and second pilot ports.

3. The valve system of claim 2, further comprising:
   a first quick-lock fitting securing a first end of the hose to the first pilot port; and
   a second quick-lock fitting securing a second end of the hose to the second pilot port.

4. The valve system of claim 1, wherein the flow control valve in the first valve assembly is a first flow control valve, and wherein the second valve assembly further comprises a second flow control valve positioned in series between the second inlet/outlet port and the valve body.

5. The valve system of claim 4, wherein the second flow control valve is at least partially receivable within the second valve body portion.

6. The valve system of claim 1, wherein the check valve further comprises
   a seal member movable between a first position, in which a flow of pressurized gas between the first inlet/outlet port and the first cylinder port is inhibited, and a second position, in which a flow of pressurized gas between the first inlet/outlet port and the first cylinder port is permitted, and
   a plunger for moving the seal member from the first position to the second position in response to an application of force on the plunger.

7. The valve system of claim 6, wherein the check valve further comprises a button coupled to the plunger that is accessible by an operator outside the check valve body, and wherein the button and the plunger are movable together in response to the operator depressing the button to displace the seal member from the first position to the second position.

8. The valve system of claim 6, wherein the plunger defines a longitudinal axis along which the plunger is movable, and wherein the plunger includes a surface oriented transverse to the longitudinal axis against which pressurized gas from the first pilot port acts to move the plunger and displace the seal member from the first position to the second position.

9. The valve system of claim 8, wherein the first valve assembly further comprises a spring biasing the plunger away from the seal member.

10. The valve system of claim 6, wherein the first valve assembly further comprises a spring biasing the seal member toward the first position.

11. The valve system of claim 6, wherein the seal member is a ball.

12. The valve system of claim 1, wherein the first valve assembly further comprises a one-way seal in parallel with the flow control valve, and wherein the one-way seal is also positioned in series between the inlet/outlet port and the check valve.

13. The valve system of claim 12, wherein the one-way seal permits bypass of the flow control valve by pressurized gas acting on a first side of the one-way seal, permitting the pressurized gas to flow directly from the inlet/outlet port to the check valve.

14. The valve system of claim 13, wherein the one-way seal prevents bypass of the flow control valve by pressurized gas acting on a second side of the one-way seal, causing the pressurized gas to flow through the flow control valve before entering the first inlet/outlet port.

15. The valve system of claim 14, wherein the one-way seal surrounds at least a portion of the flow control valve, and wherein pressurized gas acting on the first side of the one-way seal can flow around the one-way seal to bypass the flow control valve.

16. The valve system of claim 1, wherein the check valve body includes a threaded end connectable to the first cylinder port, and wherein the threaded end has a thread form compatible with a plurality of different thread configurations.

17. The valve system of claim 1, wherein the valve body includes
a first valve body portion receivable within the second port of the cylinder, and
a second valve body portion attached to and in fluid communication with the first valve body portion.

18. The valve system of claim 17, wherein the second valve body portion is rotatable relative to the first valve body portion.

19. The valve system of claim 18, wherein the second valve body portion is integrally formed as a single piece with the second inlet/outlet port and the second pilot port.

20. The valve system of claim 19, wherein the flow control valve in the first valve assembly is a first flow control valve, wherein the second valve assembly further comprises a second flow control valve surrounded by the annular cavity defined in the second valve body portion.

21. The valve system of claim 20, wherein the first valve assembly further comprises
a first banjo fitting in which the first pilot port is defined, and
a second banjo fitting in which the flow control valve is received, and
wherein the first and second banjo fittings are stackable upon the check valve body.

22. The valve system of claim 1, further comprising a reference indicium located on each of the first inlet/outlet port and the first pilot port for indicating a cut length for a hose attached to the first inlet/outlet port and the first pilot port, respectively.

23. The valve system of claim 1, further comprising a reference indicium located on each of the second inlet/outlet port and the second pilot port for indicating a cut length for a hose attached to the second inlet/outlet port and the second pilot port, respectively.

24. The valve system of claim 1, wherein the flow control valve in the first valve assembly is a first flow control valve, wherein the second valve assembly further comprises a second flow control valve having a valve member and being at least partially receivable within the second valve body portion, wherein the annular cavity is defined between the valve body and the second flow control valve.

25. The valve system of claim 24, wherein the annular cavity provides the fluid path between the second pilot port and the second inlet/outlet port regardless of the position of the valve member.

26. The valve system of claim 1, wherein the second inlet/outlet port defines a first axis, wherein the second pilot port defines a second axis coplanar with the first axis, wherein the second valve assembly further comprises a valve body extending in a longitudinal direction and at least partially receivable within a second port of the cylinder, wherein the second inlet/outlet port and the second pilot port are integrally formed as a single piece as a portion of the valve body, and wherein the first and second axes are oriented perpendicular to the longitudinal direction.

* * * * *